United States Patent
Joao

(10) Patent No.: US 7,433,834 B2
(45) Date of Patent: Oct. 7, 2008

(54) APPARATUS AND METHOD FOR FACILITATING TRANSACTIONS

(76) Inventor: Raymond Anthony Joao, 122 Bellevue Pl., Yonkers, NY (US) 10703

( * ) Notice: Subject to any disclaimer, the term of this patent is extended or adjusted under 35 U.S.C. 154(b) by 569 days.

(21) Appl. No.: 10/094,782

(22) Filed: Mar. 11, 2002

(65) Prior Publication Data

US 2002/0133424 A1    Sep. 19, 2002

Related U.S. Application Data

(60) Provisional application No. 60/298,999, filed on Jun. 18, 2001, provisional application No. 60/276,460, filed on Mar. 16, 2001.

(51) Int. Cl.
*G06Q 30/00* (2006.01)

(52) U.S. Cl. ....................................................... 705/26

(58) Field of Classification Search ................... 705/26, 705/27
See application file for complete search history.

(56) References Cited

U.S. PATENT DOCUMENTS

| | | | |
|---|---|---|---|
| 5,537,312 A * | 7/1996 | Sekiguchi et al. | 705/14 |
| 6,091,956 A * | 7/2000 | Hollenberg | 455/456.5 |
| 6,243,691 B1 * | 6/2001 | Fisher et al. | 705/37 |
| 6,587,835 B1 | 7/2003 | Treyz et al. | |
| 6,965,868 B1 | 11/2005 | Bednarek | |
| 2002/0046299 A1 * | 4/2002 | Lefeber et al. | 709/318 |
| 2003/0195806 A1 * | 10/2003 | Willman et al. | 705/14 |

OTHER PUBLICATIONS

Bharat Rao "Emerging Business Models in Online Commerce", Dec. 12, 1999.*

* cited by examiner

*Primary Examiner*—Naeem Haq
(74) *Attorney, Agent, or Firm*—Raymond A. Joao, Esq.

(57) ABSTRACT

A computer-implemented method, including storing information regarding a goal and/or expectation regarding in-store sales, revenues, profits, or losses, regarding a retail store, selecting or triggering an occurrence of an event which is selected or triggered by an employee of the retail store, processing in-store sales, revenue, profit, or loss, information corresponding to the retail store in connection with the goal and/or expectation with a processor in response to the occurrence of the event, identifying a good, product, or service, for which an in-store price change is recommended, determining an in-store price change for the good, product, or service, generating a message containing information regarding the in-store price change, and transmitting the message to a wireless device associated with an individual. The wireless device is inside the retail store.

52 Claims, 12 Drawing Sheets

APPARATUS AND METHOD FOR FACILITATING TRANSACTIONS

RELATED APPLICATIONS

This application claims the benefit of priority of U.S. Provisional Patent Application Ser. No. 60/298,999, filed Jun. 18, 2001, and entitled "APPARATUS AND METHOD FOR FACILITATING TRANSACTIONS", the subject matter of which is hereby incorporated by reference herein. This application also claims the benefit of priority of U.S. Provisional Patent Application Ser. No. 60/276,460, filed Mar. 16, 2001, and entitled "APPARATUS AND METHOD FOR FACILITATING TRANSACTIONS", the subject matter of which is hereby incorporated by reference herein.

FIELD OF THE INVENTION

The present invention pertains to an apparatus and method for facilitating transactions and, in particular, to an apparatus and method for facilitating transactions at, or in the vicinity of, a store, a retail establishment, a wholesale establishment, or a commercial establishment.

BACKGROUND OF THE INVENTION

Millions of consumers spends billions of dollars shopping in the retail marketplace, in establishments, or in stores, each year. Traditionally, consumers could shop by going to the establishment or store, locating the goods, products, or services, which they desire to purchase and purchase same at a point-of-sale location, check-out register, or transaction counter.

As the Internet and/or the World Wide Web became more and more accessible and accepted, consumers began shopping on-line by going to a web site associated with a seller and by entering into an on-line transaction for a purchase or purchases. As the information technology environment became more sophisticated, consumers began to obtain information regarding goods, products, or services, on-line. In certain instances, consumers are able to bid for goods, products, or services, while sellers have been able to auction off goods, products, or services.

Although the advances in technology, the Internet and/or the World Wide Web, have made it possible for consumers to shop on-line, many consumers still enjoy shopping in-person in traditional "brick and mortar" establishments or stores. Whether a consumer desires to make purchases on-line, over the Internet or the World Wide Web, or in-person at an establishment or store, one thing regarding consumer shopping behavior remains clear and uniform. Consumers want to save money. It is also submitted that many consumers may desire to introduce a game of chance element into their shopping activities.

The Internet and/or the World Wide Web has made it possible for consumers to bid for goods, products, or services, with remote or virtual stores. But there are many drawbacks associated with on-line purchases. The consumer, in an on-line transaction, typically cannot touch or feel the goods or products, or cannot see, first hand, the product(s) or the result of the services. Another concern in on-line transaction is that colors may appear different on-screen than in-person or in real-life.

Other concerns in on-line transactions can include the consumer being unable to try clothes on for correct sizing, an inability to consult a salesperson for assistance in-person, and an inability to physically compare and/or inspect different goods, products, or services, alongside others and in-person.

While many consumers enjoy the in-person shopping experience and favor same over on-line shopping in several areas, traditional retail establishments or stores do not typically facilitate bidding for goods, products, or services, at the point-of-sale and/or at the location of the establishment or store. Further, the information sources which can be made available to an in-person shopper can be limited when compared to information sources which are available to a shopper in an on-line environment.

In spite of the widespread developments in online shopping technology and practices, no apparatus, system, or method, exists which can allow in-store shoppers or consumers to be able to bid for products, goods, or services, and/or to receive information regarding products, goods, or services, while in, or while in the vicinity of, an establishment or store and/or while at a point-of-sale location.

SUMMARY OF THE INVENTION

The present invention pertains to an apparatus and method for facilitating transactions which overcomes the shortfalls of the prior art. The present invention pertains to an apparatus and method for facilitating transactions at, or in the vicinity of, any one or more of a store, a retail establishment, a wholesale establishment, or a commercial establishment.

The present invention can also be utilized in order to allow an individual or shopper to access information regarding goods, products and/or services, which are sold by and/or provided by an establishment, at or in the vicinity of the establishment.

The present invention can also facilitate the bidding for any good(s), product(s), and/or service(s), by the individual or shopper, the auctioning off of any good(s), product(s), and/or service(s), by the establishment, and/or the providing of information regarding an establishment or establishments where any good(s), product(s), and/or services, can be found, obtained, and/or purchased.

The present invention can also be utilized in order to monitor sales of good, products, and/or services, by an establishment, and/or to monitor the revenues received during a particular time period. The present invention can also be utilized in order to determine and/or calculate profits made by an establishment during a time period.

The present invention can be utilized in order to facilitate the sale of a good(s), a product(s), and/or a service(s), by determining a price, and/or by accepting an offer, based upon the amount of revenues and/or profits respectively received and/or earned by a respective establishment.

The apparatus of the present invention includes a central processing computer system. The apparatus can include any number of central processing computer systems. The apparatus also includes any number of user devices which can be connected to, or linked with, the central processing computer system. Any number of user devices can be located at, in, or in the vicinity of, a store or establishment, and/or in a lobby of a store or establishment, at a point-of-sale location in the store or establishment, and/or at any other location in, at, or in the vicinity of, the store or establishment. The user device(s) can also be located in a mall, a lobby, a corridor, and/or any other public or private place or location.

The apparatus can also include any number of administrative computer systems. Each administrative computer system can administer and/or manage the operation of any number of central processing computer systems.

Any of the user devices can communicate with, transmit information to, or and/or receive information from, any of the herein-described central processing computer systems, with any of the herein-described administrative computer systems, and/or with any of the other user devices described herein. Any of the central processing computer systems can communicate with, transmit information to, or and/or receive information from, any of the herein-described administrative computer systems, with any of the user devices, and/or with any of the other central processing computer systems. Any of the administrative computer systems can communicate with, transmit information to, or and/or receive information from, any of the herein-described central processing computer systems, with any of the user devices, and/or with any of the other administrative computer systems.

The communication network and/or medium which may be utilized in conjunction with the apparatus and method of the present invention can be any suitable communication system and/or network for transmitting information and/or data. The communication network and/or medium can be a line-connected network or system, a wireless network or system, a telecommunication network or system, a telephone network or system, a radio communication network or system, a digital communication network or system, a satellite communication network or system, a personal communications services (PCS) network or system, a telecommunication network or system, a local area network (LAN), a wide area network (WAN), the Internet, the World Wide Web, a wireless Internet network or system, a wireless World Wide Web network or system, an optical communication network or system, a broadband communication network or system, a Bluetooth communication network or system, a streaming video communication network or system, a streaming audio communication network or system, a live video communication network or system, and/or any other suitable communications network or system, and/or any combination(s) thereof.

Each of the central processing computer system(s), the user device(s), and/or the administrative computer(s), can include a central processing unit (CPU), a read only memory (ROM) device, a random access memory (RAM) device, an input device(s), a display device, an output device(s), a database(s), a receiver and a transmitter.

The apparatus and method of the present invention can be utilized in a number of preferred embodiments in order to facilitate transactions.

The present invention can be utilized in order to allow an individual or shopper to bid or make an offer for a good, a product, or a service, at, in, or near the vicinity of, an establishment or store. It is envisioned that user devices can be located at computers, computer terminals, kiosks, and/or communication devices, inside, or in the vicinity of, an establishment or store.

An individual or shopper can utilize the central processing computer system associated with the establishment or store via a user device. The individual or shopper can select a good(s), a product(s), or a service(s), which he or she desires to purchase and place a bid or make an offer for same. The central processing computer system can receive and process the individual's or the shopper's bid or offer, and determine whether or not to accept it. If the bid or offer is acceptable, the central processing computer system can generate a customized coupon and transmit same to the user device wherein it can be printed out at the user device. Thereafter, the individual or shopper can use the coupon in a transaction at the establishment or store.

The central processing computer system can determine any one or more of whether the particular good(s), product(s), or service(s), is available at the establishment or store, the cost of the particular good(s), product(s), or service(s) to the establishment or store which can include the wholesale price paid by the establishment or store, the total cost of purchasing, carrying, or storing, the particular good(s), product(s), or service(s) to the establishment or store, the cost of doing business involving the particular good(s), product(s), or service(s), the amount of overhead expenses allocated to the particular good(s), product(s), or service(s), and/or any other related information.

The central processing computer system can also process the shopper entered information in conjunction with any one or more of the sales of the establishment or store, the sales of the establishment or store during a given time period, the revenues of the establishment or store, the revenues of the establishment or store during a given time period, the profits or losses of the establishment or store, the profits or losses of the establishment or store for a given time period, and/or any other information which can be utilized by the central processing computer system in processing the shopper's bid or offer.

The central processing computer system can determine if the bid or offer is acceptable in view of any one of more of the cost of the particular good(s), product(s), or service(s) to the establishment or store, the wholesale price paid by the establishment or store, the total cost of purchasing, carrying, or storing, the particular good(s), product(s), or service(s) to the establishment or store, the cost of doing business involving the particular good(s), product(s), or service(s), the amount of overhead expenses allocated to the particular good(s), product(s), or service(s), and/or any other related information, the sales of the establishment or store, the sales of the establishment or store during a given time period, the revenues of the establishment or store, the revenues of the establishment or store during a given time period, the profits or losses of the establishment or store, and/or the profits or losses of the establishment or store for a given time period.

The central processing computer system can also generate a transaction report which can contain information regarding whether the shopper's bid or offer has been accepted or whether the shopper's bid or offer has been rejected. The transaction report can also contain a counteroffer from the establishment or store. The transaction report can also contain an electronic coupon.

Any information regarding whether the coupon has been utilized, or whether the coupon has not been utilized, within a certain time period and/or otherwise, can be stored by the apparatus and/or the central processing computer system for later use in any appropriate manner.

The present invention can also allow a shopper to pay or pre-pay for the respective good(s), product(s), or service(s), via the user device.

The central processing computer system can also administer and/or manage financial accounts for any of the shoppers and/or establishments or stores described herein. The central processing computer system can also effectuate financial transactions between, to, or from, any of the financial accounts associated with any of the herein-described shoppers, establishments, or stores.

A user device can also be located at the point-of-sale, at the point-of-transaction, at the check-out register, while waiting to check out. The user device can also be a wireless or mobile communication device or computer.

The user device can also be a personal computer, a telephone, or a communication device, which can allow the shopper to access the central processing computer system 10 from home, from work, and/or from any other location which is remote from the establishment or store.

The apparatus of the present invention can also be utilized to provide options for buying any of the goods, products, or services, which are or which can be offered by, or provided by, the establishment or store.

The central processing computer system can also determine whether or not to accept a shopper's bid or bids based upon the sales or revenues which the establishment or store has made or received during a given time period, based upon the profit margins of previous sales made, based upon profit targets desired to be attained by the establishment or store, and/or based upon any other operation criteria of the establishment or store.

The central processing computer system can, at any time, revise or change the prices of any of the goods, products, or services, which are or which can be offered or provided by the establishment or store. The central processing computer system can continuously process sales data and/or information, revenue data and/or information, profit or loss data and/or information, for a given time period and calculate price changes in order to increase sales, revenues, or profits, and/or to reduce losses.

The central processing computer system can determine that certain goods, products, or services are not selling as expected, an/or that the sales event is not generating expected and/or desired sales revenues or profits, and can dynamically change or revise the price or prices of certain goods, products, or services. In this manner, the central processing computer system can provide or mange a dynamically changing sales or promotional event.

The central processing computer system can continuously compare any price changes or reductions against the stored bids or offers. If, a bid or offer should become acceptable in view of a price change or price reduction, the central processing computer system can generate a notification report containing information for notifying the shopper that his or her bid or offer is now acceptable. The notification report can then be transmitted to the shopper.

The central processing computer system can continuously manage and/or administer sales activities and/or can provide price changes or price reductions in order to meet sales goals, revenue goals, or profit goals and/or in order to minimize losses.

The central processing computer system and/or the administrative computer system can be programmed with expected sales, revenues, profit goals, loss minimization goals, costs for goods, products, or services, offered by or provided by establishment or store, expected or actual overhead costs, fixed costs, variable costs, and/or any other business operating parameter data and/or information, for any establishment or store, or any for a group or chain of same.

The respective central processing computer system and/or the administrative computer system can periodically and/or upon the occurrence of certain events, monitor and analyze the sales, revenues, profits, or losses, respectively received or incurred by the establishment or store, or by a group or chain of same. The respective central processing computer system and/or the administrative computer system can, depending upon the results of the analysis, identify goods, products, or services for either price reductions or price increases.

The respective central processing computer system and/or the administrative computer system can, also schedule sales or sales promotion times and provide notification to shoppers electronically, such as by transmitting a sales notification message to the shopper's wireless telephone, personal communication device, personal digital assistant, beeper or pager, and/or any other communication device.

The respective central processing computer system and/or the administrative computer system can also update the sales computers or transaction computers of the establishment or store, provide notification to sales persons, electronically modify electronic price displays in the establishment or store, and/or perform any other related activities or functionality.

The respective central processing computer system 10 and/or the administrative computer system 30 can also update the sales computers or transaction computers of the establishment or store, change or modify electronic price displays, update electronic sales bulletin boards, notify sales personnel of the price changes, and/or perform any other tasks. The respective central processing computer system and/or the administrative computer system can also identify goods, products, or services, for price increases in an effort to increase revenues, profits or reduce losses.

The central processing computer can await the occurrence of a processing event. The processing event can occur upon the expiration of a time interval, such as, for example, a pre-specified number of minutes, an hour, a pre-specified number of hours, a day, a pre-specified number of days.

The processing event can also be the meeting of a sales level, a revenue level, a profit level, a loss level, the start of an accounting period, the end of a sales event, the start of an accounting period, the end of an accounting period, a receipt of a delivery of any goods, products, or services, the selling of a good, product or service, and/or the selling out of a good, product, or services. The processing event can also be selected at and/or triggered at any time by a store manager or other authorized employee.

The central processing computer system and/or the administrative computer system can monitor the sales revenues received by an establishment, store, or by a group or chain of same, the costs of goods sold to an establishment, store, or group or chain of same, the profits or losses of establishment, store, or group or chain of same, and/or any other data and/or information regarding the business operations of the establishment, store, or group or chain of same.

Upon the occurrence of the processing event, the central processing computer system can process the information concerning the respective sales levels, revenue levels, profits earned or profit levels, losses incurred, etc., in conjunction with the respective goals or expectations relating to same.

If the central processing computer system determines that any one or more of the respective sales levels, revenue levels, profits earned or profit levels, losses incurred, etc., do not, or did not, meet or exceed, or are not meeting or exceeding, the respective goals or expectations which were set for same, then the central processing computer system can identify the particular goods, products, or services, for which prices should be reduced and/or for which prices should be increased. The central processing computer system can also determine the amounts or percentages of the respective price reductions or decreases and/or the amounts or percentages of the respective price increases. The central processing computer system can also determine new prices or promotional prices for any of the respective goods, products, or services.

The central processing computer system can utilize data and/or information concerning the profit margins for the respective goods, products, or services, the number or quantities of the respective goods, products, or services previously sold and their respective selling prices and/or profit margins, the number or quantity of the respective goods, products, or services currently being held in inventory or stock, and/or any fixed, variable, or overhead, costs associated with same.

The central processing computer system can also utilize data and/or information concerning the past sales history or histories regarding and/or relating to the establishment or store and/or the respective goods, products, or services, past consumer buying behavior or consumer purchasing histories regarding the respective goods, products, or services, and/or consumer response or reactions to sales or promotion events. The central processing computer system can also utilize statistical, probabilistic, and/or forecasting, models and/or routines, data and/or information, in order to identify goods, products or services, for respective price changes, reductions or increases, as well as to determine the respective price changes, reductions or increases.

The central processing computer system can also effectuate the respective price changes, reductions, or increases, for the goods, products, or services, which were previously identified.

The central processing computer system can also provide notification of the price changes to sales personnel or employees of the establishment or store.

The central processing computer system can also provide notification to a shopper or shoppers who have either previously bid on, or made offers for, goods, products, or services, for which prices have been changed. The central processing computer system can also provide notification to a shopper or shoppers who have requested to be notified regarding price changes for any goods, products, or services.

The central processing computer system can also determine whether any one or more of the respective sales levels, revenue levels, profit levels can be increased and/or further optimized and/or whether losses can be further reduced or minimized.

If the central processing computer system determines that any one or more of the respective sales levels, revenue levels, profit levels can be increased and/or further optimized and/or whether losses can be further reduced or minimized, then the central processing computer system can identify goods, products, or services, for which prices can be changed or modified.

The present invention can also be utilized in order to provide and/or administer an affiliated marketing program(s) between any of the establishment(s), store(s), retail store(s), wholesale store(s), wholesaler(s), and/or commercial establishment(s), who or which utilize the present invention. It is envisioned that any number of establishment(s), store(s), retail store(s), wholesale store(s), wholesaler(s), and/or commercial establishment(s), can enter into an affiliated marketing program or programs with any number of establishment(s), store(s), retail store(s), wholesale store(s), wholesaler(s), and/or commercial establishment(s). The present invention can be utilized in order to administer an affiliated marketing program or programs.

The present invention can also be utilized in order to facilitate and/or administer an affiliated marketing relationship wherein affiliated marketing referrals can be provided to a shopper in response to a shopper's request for information for, and/or a bid for, a good, product, or service.

The present invention can also be utilized in affiliated marketing relationship embodiment, wherein an affiliated marketing partner(s) can be notified of the presence of a shopper for, and/or the willingness and/or the interest of the shopper to make a purchase of, a good(s), product(s), and/or service(s). The affiliated marketing partner(s) can thereafter communicate with the shopper in order to provide information regarding a good(s), product(s), and/or service(s), to the shopper. The affiliated marketing partner(s) can also accept a bid by the shopper, make a counteroffer, an offer, and/or an upsell offer, to the shopper.

The present invention can also be utilized by any establishments, stores, retail stores, wholesale stores, wholesalers, and/or commercial establishments, in order to process information regarding a group of available shoppers and to communicate with any one or more of these shoppers while they may be in, at, or in the vicinity of, the respective establishment, store, retail store, wholesale store, wholesaler, and/or commercial establishment. The respective establishment, store, retail store, wholesale store, wholesaler, and/or commercial establishment, can generate and transmit sales messages, sales offerings, discount offerings, upsell offerings, etc., to any one or more shoppers.

The respective establishment, store, retail store, wholesale store, wholesaler, and/or commercial establishment, can generate and transmit sales messages, sales offerings, discount offerings, upsell offerings, etc., to any one or more shoppers based on the respective shopper's purchasing habits, personal spending habits, personal characteristics, personal profiles, and/or any other appropriate information which can be gathered and/or stored regarding the individual shoppers.

The present invention can also be utilized by establishments, stores, retail stores, wholesale stores, wholesalers, and/or commercial establishments, in order to process information regarding a shopper or multiple shoppers as they enter into, and/or as they enter the vicinity of, a respective establishment, store, retail store, wholesale store, wholesaler, and/or commercial establishment, and/or a mall or group of same. Upon receiving information that a shopper or shoppers are in, at, or in the vicinity of, a respective establishment, store, retail store, wholesale store, wholesaler, and/or commercial establishment, the present invention can communicate with a shopper or shoppers. The present invention can generate and transmit sales messages, sales offerings, discount offerings, upsell offerings, etc., to any one or more shoppers.

The present invention can also provide advertisement messages and/or information to any of the individuals or shoppers who utilize the apparatus of the present invention. The present invention can also be utilized in order to obtain market research information and/or survey information from the individuals or shoppers who utilize the apparatus of the present invention.

Accordingly, it is an object of the present invention to provide an apparatus and method for facilitating transactions.

It is another object of the present invention to provide apparatus and method for facilitating transactions at, or in the vicinity of, any one or more of a store, a retail establishment, a wholesale establishment, or a commercial establishment.

It is still another object of the present invention to provide an apparatus and method for facilitating transactions which can allow an individual or shopper to access information regarding goods, products and/or services.

It is yet another object of the present invention to provide an apparatus and method for facilitating transactions which can allow an individual or shopper to access information regarding goods, products and/or services, which are sold by and/or provided by an establishment, at or in the vicinity of the establishment.

It is another object of the present invention to provide an apparatus and method for facilitating transactions which can facilitate the bidding for good(s), product(s), and/or service(s).

It is still another object of the present invention to provide an apparatus and method for facilitating transactions which can facilitate the auctioning off of good(s), product(s), and/or service(s).

It is yet another object of the present invention to provide an apparatus and method for facilitating transactions which can monitor sales of good, products, and/or services.

It is another object of the present invention to provide an apparatus and method for facilitating transactions which can monitor revenues received by an establishment or store.

It is still another object of the present invention to provide an apparatus and method for facilitating transactions which can monitor revenues received by an establishment or store during a particular time period.

It is yet another object of the present invention to provide an apparatus and method for facilitating transactions which can calculate profits made by an establishment or store.

It is another object of the present invention to provide an apparatus and method for facilitating transactions which can calculate profits made by an establishment or store during a time period.

It is still another object of the present invention to provide an apparatus and method for facilitating transactions which can facilitate a sale of a good (s), a product (s), and/or a service (s), by determining a price, and/or by accepting an offer, based upon the amount of revenues and/or profits respectively received and/or earned by a respective establishment or store.

It is yet another object of the present invention to provide an apparatus and method for facilitating transactions which can be utilized on, or over, any communication network or system.

It is another object of the present invention to provide an apparatus and method for facilitating transactions which can be utilized on, or over, a wireless communication network or system.

It is still another object of the present invention to provide an apparatus and method for facilitating transactions which can be utilized on, or over, the Internet or the World Wide Web.

It is yet another object of the present invention to provide an apparatus and method for facilitating transactions which can be utilized on, or over, the wireless Internet or the wireless World Wide Web.

It is another object of the present invention to provide an apparatus and method for facilitating transactions which can be utilized on, or over, a local area network or a wide area network.

It is still another object of the present invention to provide an apparatus and method for facilitating transactions which can generate a customized coupon.

It is yet another object of the present invention to provide an apparatus and method for facilitating transactions which can transmit a coupon to an individual or shopper.

It is another object of the present invention to provide an apparatus and method for facilitating transactions which determine any one or more of whether the particular good(s), product(s), or service(s), is available at an establishment or store, the cost of the particular good(s), product(s), or service(s) to the establishment or store, the total cost of purchasing, carrying, or storing, the particular good(s), product(s), or service(s) to the establishment or store, the cost of doing business involving the particular good(s), product(s), or service(s), the amount of overhead expenses allocated to the particular good(s), product(s), or service(s), and/or any other related information.

It is yet another object of the present invention to provide an apparatus and method for facilitating transactions which can process shopper entered information in conjunction with any one or more of the sales of an establishment or store, the sales of the establishment or store during a given time period, the revenues of the establishment or store, the revenues of the establishment or store during a given time period, the profits or losses of the establishment or store, the profits or losses of the establishment or store for a given time period, and/or any other information.

It is another object of the present invention to provide an apparatus and method for facilitating transactions which can determine if a bid or offer is acceptable in view of any store operating information or accounting information.

It is still another object of the present invention to provide an apparatus and method for facilitating transactions which can generate a transaction report which can contain information regarding whether a shopper's bid or offer has been accepted or whether the shopper's bid or offer has been rejected.

It is yet another object of the present invention to provide an apparatus and method for facilitating transactions which can store information regarding whether a coupon has been utilized or whether a coupon has not been utilized.

It is another object of the present invention to provide an apparatus and method for facilitating transactions which can store information regarding whether a coupon has been utilized or whether a coupon has not been utilized within a certain time period.

It is still another object of the present invention to provide an apparatus and method for facilitating transactions which can administer and/or manage financial accounts for shoppers and/or establishments or stores.

It is yet another object of the present invention to provide an apparatus and method for facilitating transactions which can effectuate financial transactions between, to, or from, any of the financial accounts associated with shoppers, establishments, or stores.

It is another object of the present invention to provide an apparatus and method for facilitating transactions which can provide options for buying goods, products, or services, which are or which can be offered by, or provided by, an establishment or store.

It is still another object of the present invention to provide an apparatus and method for facilitating transactions which can revise or change the price(s) of any goods, products, or services, which are or which can be offered or provided by an establishment or store.

It is yet another object of the present invention to provide an apparatus and method for facilitating transactions which can process any one or more of sales data and/or information, revenue data and/or information, profit or loss data and/or information.

It is another object of the present invention to provide an apparatus and method for facilitating transactions which can process any one or more of sales data and/or information, revenue data and/or information, profit or loss data and/or information, for a given time period and calculate price changes in order to increase sales, revenues, or profits, and/or to reduce losses.

It is still another object of the present invention to provide an apparatus and method for facilitating transactions which can determine that certain goods, products, or services, are not selling as expected, or that a sales event is not generating expected and/or desired sales revenues or profits.

It is yet another object of the present invention to provide an apparatus and method for facilitating transactions which can determine that certain goods, products, or services, are not selling as expected, or that a sales event is not generating expected and/or desired sales revenues or profits, and dynamically change or revise the price or prices of certain goods, products, or services.

It is another object of the present invention to provide an apparatus and method for facilitating transactions which can compare price changes or reductions against bids or offers.

It is still another object of the present invention to provide an apparatus and method for facilitating transactions which can manage and/or administer sales activities.

It is yet another object of the present invention to provide an apparatus and method for facilitating transactions which can manage and/or administer sales activities and can provide price changes or price reductions in order to meet sales goals, revenue goals, or profit goals and/or in order to minimize losses.

It is another object of the present invention to provide an apparatus and method for facilitating transactions which can periodically and/or upon the occurrence of certain events, monitor and analyze the sales, revenues, profits, or losses, respectively received or incurred by an establishment or store, or by a group or chain of same.

It is still another object of the present invention to provide an apparatus and method for facilitating transactions which can identify goods, products, or services, for either price reductions or price increases.

It is yet another object of the present invention to provide an apparatus and method for facilitating transactions which can schedule sales or sales promotion times.

It is another object of the present invention to provide an apparatus and method for facilitating transactions which can schedule sales or sales promotion times and provide notification of same to shoppers.

It is still another object of the present invention to provide an apparatus and method for facilitating transactions which can any one or more of update sales computers or transaction computers of an establishment or store, provide notification to sales persons, or electronically modify electronic price displays in the establishment or store.

It is yet another object of the present invention to provide an apparatus and method for facilitating transactions which can effectuate price changes, reductions, or increases, for a goods, products, or services.

It is another object of the present invention to provide an apparatus and method for facilitating transactions which can provide notification to a shopper or shoppers who have either previously bid on, or made offers for, goods, products, or services, for which prices have been changed.

It is still another object of the present invention to provide an apparatus and method for facilitating transactions which can provide notification to a shopper or shoppers who have requested to be notified regarding price changes for any goods, products, or services.

It is yet another object of the present invention to provide an apparatus and method for facilitating transactions which can determine whether any one or more of sales levels, revenue levels, profit levels can be increased and/or further optimized and/or whether losses can be further reduced or minimized.

It is another object of the present invention to provide an apparatus and method for facilitating transactions which can provide advertisement messages and/or information.

It is still another object of the present invention to provide an apparatus and method for facilitating transactions which can be utilized in order to obtain market research information and/or survey information.

It is yet another object of the present invention to provide an apparatus and method for facilitating transactions which can be utilized in order to provide and/or administer an affiliated marketing program.

It is another object of the present invention to provide an apparatus and method for facilitating transactions which can be utilized in order to provide and/or administer an affiliated marketing program, wherein an affiliated marketing referral can be provided to a shopper in response to a shopper's request for information for, and/or a bid for, a good, product, or service.

It is still another object of the present invention to provide an apparatus and method for facilitating transactions which can be utilized in order to provide notification to an affiliated marketing partner of the presence of a shopper, and/or of the willingness and/or the interest of a shopper to make a purchase of, a good(s), product(s), and/or service(s).

It is yet another object of the present invention to provide an apparatus and method for facilitating transactions which can be utilized in order to allow an affiliated marketing partner(s) to communicate communicate with a shopper.

It is another object of the present invention to provide an apparatus and method for facilitating transactions which can be utilized in order to process information regarding a shopper or group of shoppers in, at, and/or in the vicinity of, a respective establishment, store, retail store, wholesale store, wholesaler, and/or commercial establishment.

It is still another object of the present invention to provide an apparatus and method for facilitating transactions which can be utilized in order to communicate with a shopper or group of shoppers in, at, and/or in the vicinity of, a respective establishment, store, retail store, wholesale store, wholesaler, and/or commercial establishment.

It is yet another object of the present invention to provide an apparatus and method for facilitating transactions which can be utilized in order to generate and/or transmit sales messages, sales offerings, discount offerings, and/or upsell offerings, to a shopper or shoppers.

It is another object of the present invention to provide an apparatus and method for facilitating transactions which can be utilized in order to process information regarding a shopper or multiple shoppers as they enter into, and/or as they enter the vicinity of, a respective establishment, store, retail store, wholesale store, wholesaler, and/or commercial establishment, and/or a mall or group of same.

Other objects and advantages of the present invention will be apparent to those skilled in the art upon a review of the Description of the Preferred Embodiments taken in conjunction with the Drawings which follow.

DESCRIPTION OF THE PREFERRED EMBODIMENTS

The present invention pertains to an apparatus and method for facilitating transactions and, in particular, to an apparatus and method for facilitating transactions at, or in the vicinity of, a store, a retail establishment, a wholesale establishment, or a commercial establishment.

The apparatus and method of the present invention can be utilized in order to allow an individual or shopper to access information regarding goods, products and/or services, which are sold by and/or provided by an establishment, at or in the vicinity of the establishment.

The apparatus and method of the present invention can also facilitate the bidding for any good(s), product(s), and/or service(s), by the individual or shopper, the auctioning off of any good(s), product(s), and/or service(s), by the establishment, and/or the providing of information regarding an establishment or establishments where any good(s), product(s), and/or services, can be found, obtained, and/or purchased.

The apparatus and method of the present invention can also be utilized in order to monitor sales of good, products, and/or services, by an establishment, and/or to monitor the revenues received during a particular time period. The apparatus and method of the present invention can also be utilized in order to determine and/or calculate profits made by an establishment during a time period.

The apparatus and method of the present invention can also be utilized in order to facilitate the sale of a good(s), a product(s), and/or a service(s), by determining a price, and/or by accepting an offer, based upon the amount of revenues and/or profits respectively received and/or earned by a respective establishment.

As defined herein, the terms "individual", "shopper", "purchaser", "user", or the plural of same, refers to any individuals, shoppers, purchasers, users, and/or entities, who or which utilize the apparatus and method of the present invention.

As used herein, the terms "establishment", "store", "retail store", "wholesale store", "wholesaler", and/or "commercial establishment", or the plural of same, refers to any establishment(s), store(s), retail store(s), wholesale store(s), wholesaler(s), and/or commercial establishment(s), which utilize the apparatus and method of the present invention in order to conduct business and/or for any other purpose.

Applicant hereby incorporates by reference herein the subject matter and teachings of U.S. Provisional Patent Application Ser. No. 60/298,999 which teaches and discloses an apparatus and method for facilitating transactions, the subject matter of which is hereby incorporated by reference herein. This application also claims the benefit of priority of U.S. Provisional Patent Application Ser. No. 60/276,460 which teaches and discloses an apparatus and method for facilitating transactions, the subject matter of which is hereby incorporated by reference herein.

Figure 1:
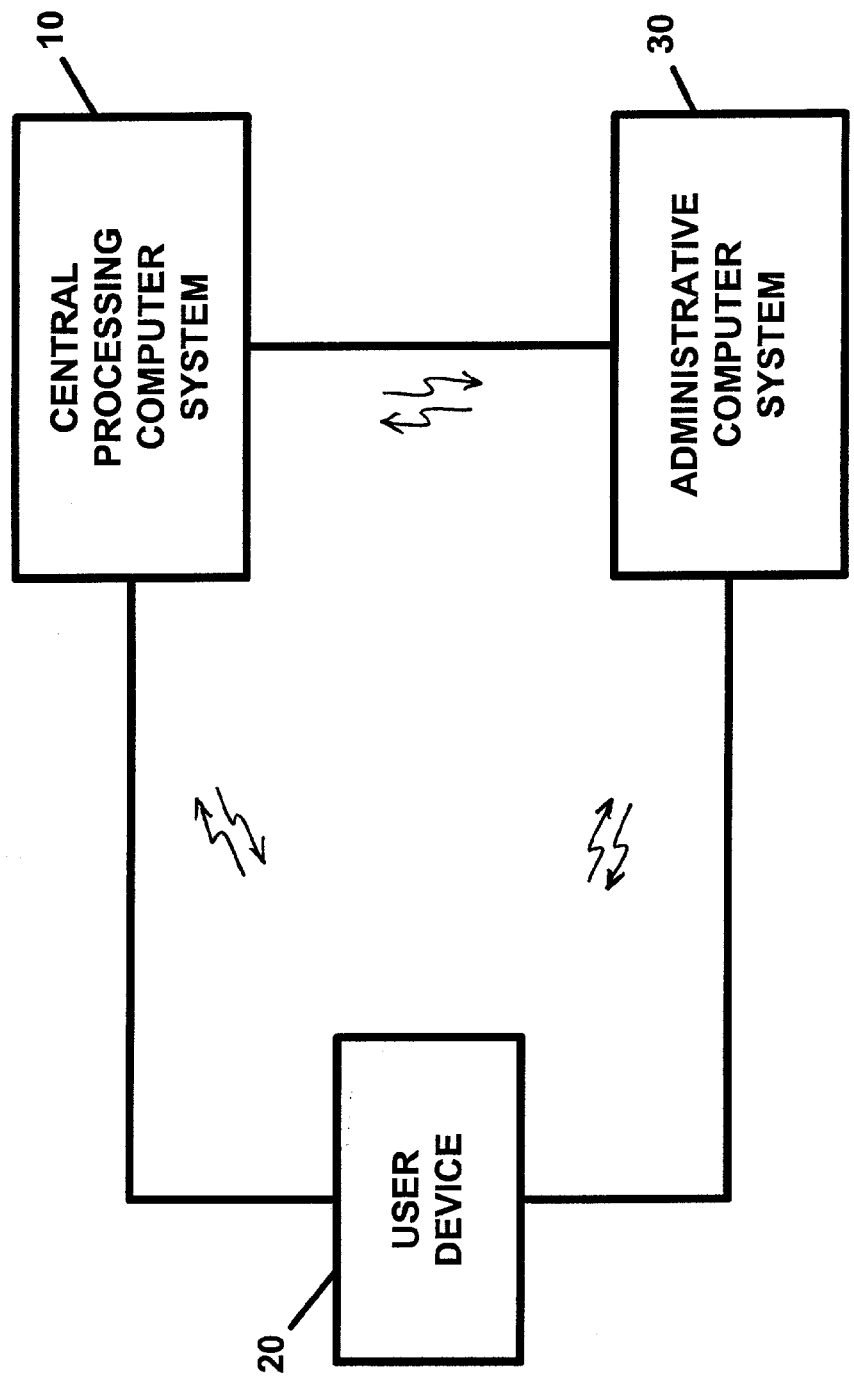
FIG. 1 illustrates a preferred embodiment of the apparatus of the present invention, in block diagram form.

FIG. 1 illustrates the apparatus of the present invention, in block diagram from. The apparatus of FIG. 1 is designated generally by the reference numeral 100. With reference to FIG. 1, the apparatus 100 includes a central processing computer system 10. The apparatus can include any number of central processing computer systems 10.

Each central processing computer system 10 can also include any number of computers or computer systems and/or any devices or components which can or which may be described herein as being utilized by the central processing computer system 10 in order to perform any and/or all of the respective functions described herein as being performed by, and/or being facilitated by, the central processing computer system 10.

In the preferred embodiment, a central processing computer 10 can be associated with a particular establishment or store. The central processing computer 10 can also be associated with any number of stores. The central processing computer system 10 can also be associated any number of establishments or stores in a chain of such establishments or stores.

The central processing computer system 10 can also be associated any number of different establishments or stores and/or any number of types of establishments or stores. For example, a central processing computer system 10 can be associated with any number of establishments or stores located in a shopping mall or a in a specified area or location.

With reference to FIG. 1, the apparatus 100 also includes any number of user devices 20 which can be connected to, or linked with, the central processing computer system 10. The user device 20 can be utilized by any of the herein-described individuals or shoppers in order to interface with, and/or interact with, the central processing computer system 20.

In the preferred embodiment, the user device 20 can be a computer, a computer terminal, a terminal device connected to, or associated with, the central processing computer system 10, a kiosk, a communication device, a telephone, an interactive television, and/or any other appropriate or suitable device. In the preferred embodiment, any number of user devices 20 can be located at, in, or in the vicinity of, a store or establishment, and/or in a lobby of a store or establishment, at a point-of-sale location in the store or establishment, and/or at any other location in, at, or in the vicinity of, the store or establishment. The user device(s) 20 can also be located in a mall, a lobby, a corridor, and/or any other public or private place or location.

In another preferred embodiment, the user device 20 can be a personal computer, a home computer, or other communication device located at the home of an individual or shopper. The user device 20 can also be a communication device, a personal communication device, a telephone, a cellular telephone, a wireless telephone, a videophone, a video telephone, a palm device, a palm-top device, a handheld device, a personal digital assistant, and/or any other communication device.

The individual or user can interact with the central processing computer system 10 via the user device 20.

With reference to FIG. 1, the apparatus 100 can also include any number of administrative computer systems 30. Each administrative computer system 30 can administer and/or or manage the operation of any number of central processing computer systems 10.

For example, a department store can have, or can be comprised of a chain of stores or establishments. An administrative computer system 30 associated with the department store chain can coordinate the activities and/or the operations of the respective stores by providing information to, and/or processing information received from, any of the respective central processing computer system(s) 10 which may be associated with, and/or which may be located at, each of the stores or establishments in the chain.

The administrative computer system 30 can be linked to, and/or can be connected with, any number of central processing computer systems 10.

In the preferred embodiment, any of the user devices 20 can communicate with, transmit information to, or and/or receive information from, any of the herein-described central processing computer systems 10, with any of the herein-described administrative computer systems 30, and/or with any of the other user devices 20 described herein. Any of the central processing computer systems 10 can communicate with, transmit information to, or and/or receive information from, any of the herein-described administrative computer systems 30, with any of the user devices 20, and/or with any of the other central processing computer systems 10. Any of the administrative computer systems 30 can communicate with, transmit information to, or and/or receive information from, any of the herein-described central processing computer systems 10, with any of the user devices 20, and/or with any of the other administrative computer systems 30.

In the preferred embodiment, the central processing computer system(s) 10 and/or the administrative computer system(s) 30 can be a typical central processing computer and/or server computer such as those utilized in conjunction with an on-line service and/or in network environments as utilized in conjunction with the Internet, the World Wide Web and/or any other suitable network or network environment.

The communication network and/or medium which may be utilized in conjunction with the apparatus and method of the present invention can be any suitable communication system and/or network for transmitting information and/or data. In this regard, the communication network and/or medium can be a line-connected network or system, a wireless network or system, a telecommunication network or system, a telephone network or system, a radio communication network or system, a digital communication network or system, a satellite communication network or system, a personal communications services (PCS) network or system, a telecommunication network or system, a local area network (LAN), a wide area network (WAN), the Internet, the World Wide Web, a wireless Internet network or system, a wireless World Wide Web network or system, an optical communication network or system, a broadband communication network or system, a Bluetooth communication network or system, a streaming video communication network or system, a streaming audio communication network or system, a live video communication network or system, and/or any other suitable communications network or system, and/or any combination(s) thereof.

Figure 2:
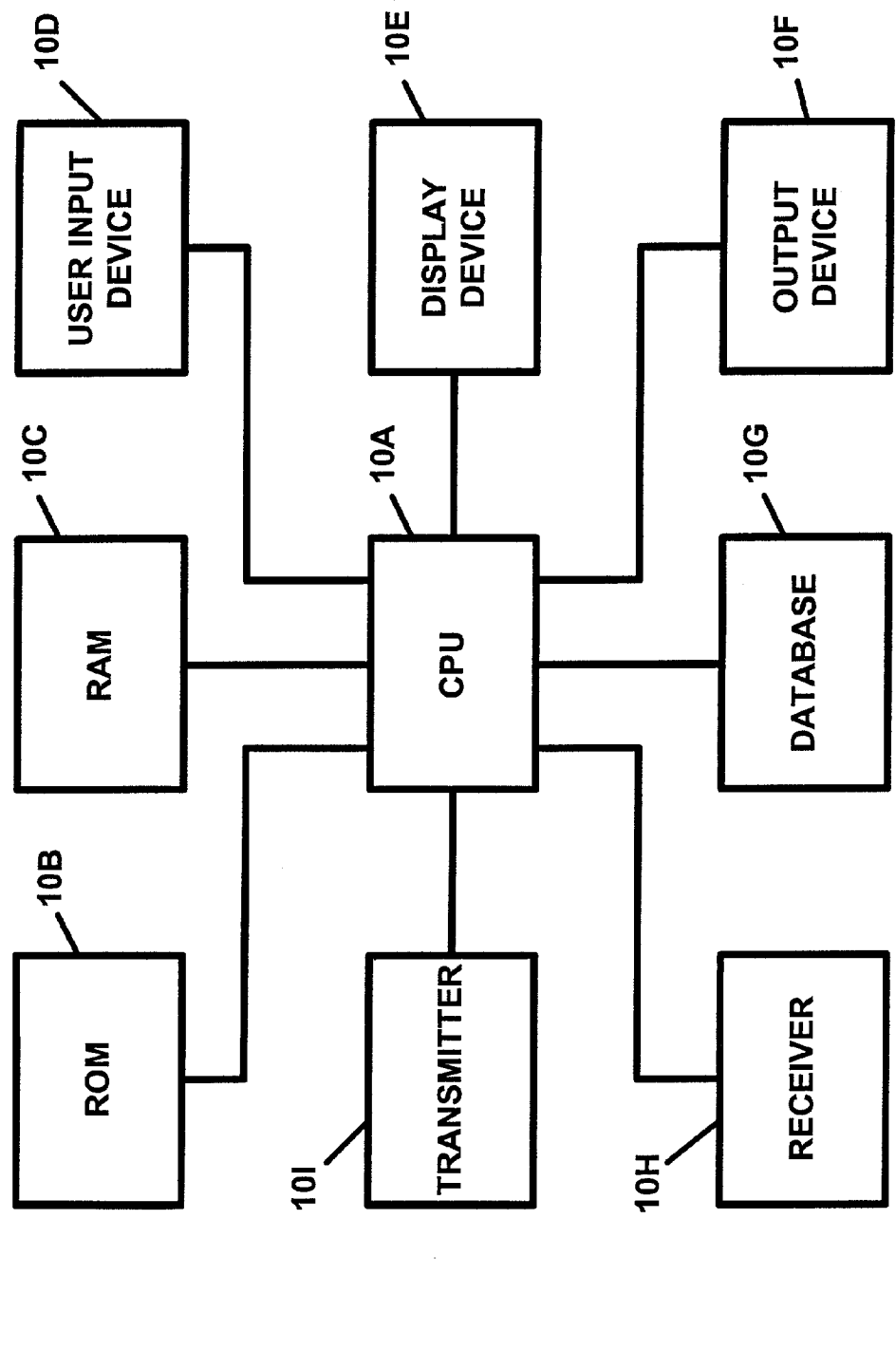
FIG. 2 illustrates the central processing computer system of FIG. 1, in block diagram form.

FIG. 2 illustrates the central processing computer system 10 of FIG. 1, in block diagram form. With reference to FIG. 2, the central processing computer system 10 includes a central processing unit (CPU) 10A. The central processing unit (CPU) 10A may be a microprocessor, a microcomputer, a minicomputer, a macro-computer, or a mainframe computer, depending upon the application.

The central processing computer system 10 also includes a read only memory (ROM) device 10B and a random access memory (RAM) device 10C which are also connected to the CPU 10A. The central processing computer system 10 also includes a user input device(s) 10D which can include any one or more of a keyboard, a scanner, a user pointing device, such as, for example, a mouse, an audio input device, a touch pad, etc., which input device(s) 10D is also connected to the CPU 10A. The input devices 10D can also include cash registers, transaction registers, and/or any other transaction devices which can provide sales or transaction information into the central processing computer system 10.

The central processing computer system 10 also includes a display device 10E, such as a display monitor and/or a display screen for providing the herein-described information to the operator of the central processing computer system 10.

The display device 10E can also include display devices which can be located on merchandise display racks, at checkout registers, and/or at other locations in or throughout an establishment or store. The display device can be merchandise or promotional display devices, bulletin board display devices, and/or any other type or kind of display devices.

The display device 10E is also connected to the CPU 10A. The central processing computer system 10 can also include an output device 10F., such as a printer, a display device, and/or a modem, for outputting, in either or both of hard copy form or electronic form, any of the information which is described herein as being provided by, or at, the central processing computer system 10. The output device 10F can also be connected to the CPU 10A.

The central processing computer system 10 can also include a database(s) 10G, which can contain any data and/or information which may be required, and/or which may be desired, for performing any of the functionality and/or processing routines described herein as being performed by the central processing computer system 10 and/or the apparatus 100.

The database 10G can contain data and/or information regarding the various goods, products, and/or services provided by the respective establishment(s), store(s), retail store(s), wholesale store(s), wholesaler(s), and/or commercial establishment(s), which is or are associated with the respective central processing computer system 10.

The database 10G can contain data and/or information regarding the price of, the cost of, the prices paid for, or wholesale prices paid for, the respective goods, products or services. The database 10G can also contain data and/or information regarding the retail or resale prices of the respective goods, products, or services, the profit margins corresponding to the respective goods, products, or services, sale prices for the respective goods, products, or services, sale times for the respective goods, products, or services, and/or any other data and/or information regarding the respective goods, products or services.

The database 10G can also contain information regarding dates and/or times of sales pertaining to any of the respective goods, products, or services, which are or which can be offered by and/or which are provided by, the respective establishment(s), store(s), retail store(s), wholesale store(s), wholesaler(s), and/or commercial establishment (s) The database 10G can also contain data and/or information regarding the operating data and/or information for the respective establishment(s), store(s), retail store(s), wholesale store(s), wholesaler(s), and/or commercial establishment(s), inventory cost data for the establishment(s), store(s), retail store(s), wholesale store(s), wholesaler(s), and/or commercial establishment(s), operating expense data and/or information for the respective establishment(s), store(s), retail store(s), wholesale store(s), wholesaler(s), and/or commercial establishment(s), and/or data and/or information for administering sales offerings for the respective establishment(s), store(s), retail store(s), wholesale store(s), wholesaler(s), and/or commercial establishment(s).

The database 10G can also contain data and/or information regarding operating expense requirements for a specific time period for a respective establishment(s), store(s), retail store(s), wholesale store(s), wholesaler(s), and/or commercial establishment(s), profit margins for the various goods, products, or services, offered by or provided by the respective establishment(s), store(s), retail store(s), wholesale store(s), wholesaler(s), and/or commercial establishment(s), instantaneous profit margins for a present price or present sale price of any goods, products, or services, offered by or provided by the respective establishment(s), store(s), retail store(s), wholesale store(s), wholesaler(s), and/or commercial establishment(s), and/or any other data and/or information relating to the above information.

The database 10G can also contain information regarding available inventory, and/or expected inventory, of or for the respective establishment(s), store(s), retail store(s), wholesale store(s), wholesaler(s), and/or commercial establishment(s), as well as inventory or expected inventory of other establishments, stores, retail stores, wholesale stores, wholesalers, and/or commercial establishments. The database 10G can also contain data and/or information regarding the revenues received by a respective establishment(s), store(s), retail store(s), wholesale store(s), wholesaler(s), and/or commercial establishment(s), during a given time period, business day, and/or any other time interval or period.

The database 10G can also contain real-time sales revenue information, real-time cumulative sales revenue information, real-time cumulative cost of sold inventory or cost of goods, products, or services, sold information, real-time cumulative profit or loss information, and/or any other data and/or information for or regarding the operating state or states of a respective establishment(s), store(s), retail store(s), wholesale store(s), wholesaler(s), and/or commercial establishment(s), for any desired time periods.

For example, the database 10G can contain data and/or information regarding the revenues, cost of inventory sold, profit or loss information, for any given or selected time period for which a respective establishment(s), store(s), retail store(s), wholesale store(s), wholesaler(s), and/or commercial establishment(s), is operating.

The database 10G, and/or the central processing computer system 10 can be linked to and/or can receive information from the respective cash register system, cash register computer system, sales recording or sales registering system or computer system, and/or an accounts receivable system or computer system, for or associated with the respective establishment(s), store(s), retail store(s), wholesale store(s), wholesaler(s), and/or commercial establishment(s)

The database 10G, and/or the central processing computer system 10 can also be linked to and/or can receive information from the inventory computer system of the respective establishment(s), store(s), retail store(s), wholesale store(s), wholesaler(s), and/or commercial establishment(s). The database 10G can also be linked to and/or can receive information from any other computer system(s), administrative computer system(s), and/or management information computer system(s), of the respective establishment(s), store(s), retail store(s), wholesale store(s), wholesaler(s), and/or commercial establishment(s).

The database 10G can also contain information regarding any individuals or shoppers who or which may have accounts, credit accounts, charge accounts, debit accounts, and/or financial accounts, with the respective establishment(s), store(s), retail store(s), wholesale store(s), wholesaler(s), and/or commercial establishment(s). The database 10G can contain data and/or information regarding the individuals or shoppers, include but not limited to, the name, names, address, telephone number, facsimile number, e-mail address, and account information, for or corresponding to each of the individuals or shoppers who utilize the apparatus 100.

The database 10G can also contain data and/or information regarding the shopping or purchasing history or histories, buying patterns, and/or other information for or regarding any of the individuals or shoppers who or which utilize the apparatus 100 of the present invention.

The database 10G can also contain data and/or information for pricing options to buy or options to sell any of the goods, products, and/or services, which are or which can be offered by or provided by the respective establishment(s), store(s), retail store(s), wholesale store(s), wholesaler(s), and/or commercial establishment(s).

The database 10G can also contain data and/or information regarding establishment(s), store(s), retail store(s), wholesale store(s), wholesaler(s), and/or commercial establishment(s), which may be participating in affiliated marketing programs which can be provided by the apparatus and methods of the present invention. The database 10G can contain information regarding any establishment(s), store(s), retail store(s), wholesale store(s), wholesaler(s), and/or commercial establishment(s) which desire to participate with any other establishment(s), store(s), retail store(s), wholesale store(s), wholesaler(s), and/or commercial establishment(s) in an affiliated marketing relationship.

The data and/or information which is stored in the database 10G can include identification information (i.e. name, description of goods and/or services provided, prices of goods and/or services provided, etc.), contact information (i.e. address, web address, telephone number, fax number, e-mail address, etc.), affiliated marketing information (i.e. types of goods and/or services involved, information regarding the type or kind of information, types of affiliated marketing partners, terms of any affiliated marketing agreements (i.e. referral procedure and manner, referral fees, manner in which referral fees are paid, etc.), programs in which the respective establishment(s), store(s), retail store(s), wholesale store(s), wholesaler(s), and/or commercial establishment(s) are participating in and/or are involved in, for any of the establishment(s), store(s), retail store(s), wholesale store(s), wholesaler(s), and/or commercial establishment(s) participating in any affiliated marketing activities pursuant to the present invention.

The database 10G can also contain any other data and/or information which may be needed and/or desired for performing any of the processing routines and/or functionality described herein as being provided by the central processing computer system 10 and/or apparatus 100. The database 10G can also be connected to the CPU 10A.

The central processing computer system 10 can also include a receiver 10H for receiving data and/or information, including any of the herein-described information, and/or any of the other information described herein as being provided to the central processing computer system 10 from any of the user devices 20, from any of the administrative computer systems 30, and/or from any of the other central processing computer system 10 described herein. The receiver 10H can also be connected to the CPU 10A.

The central processing computer system 10 can also include a transmitter 10I for transmitting data and/or information, including any of the herein-described information, and/or any of the other information described herein as being provided from the central processing computer system 10 to any of the user devices 20, to any of the administrative computer systems 30, and/or to any of the other central processing computer systems 10 described herein. The transmitter 10I can also be connected to the CPU 10A.

Figure 3:
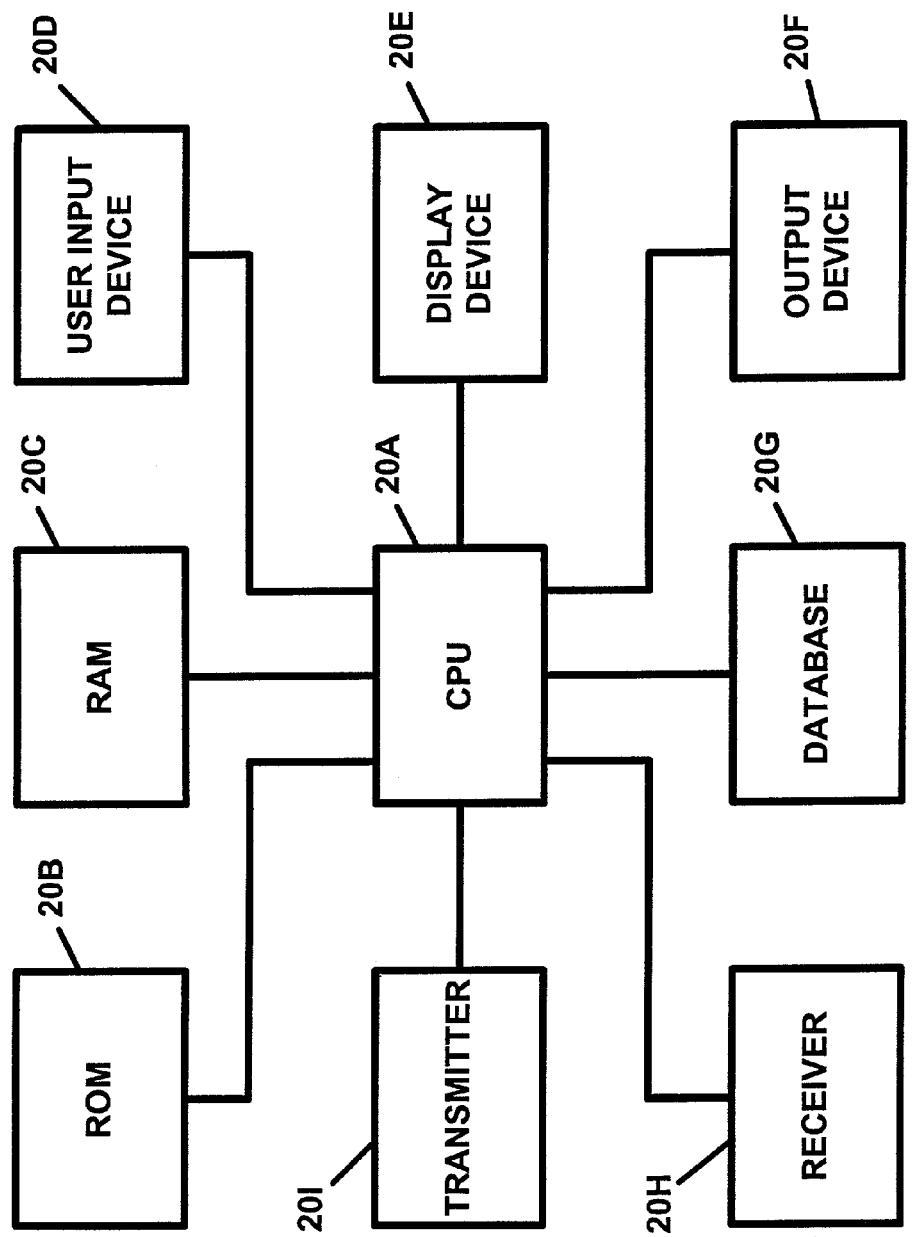
FIG. 3 illustrates the user device of FIG. 1, in block diagram form.

FIG. 3 illustrates the user device 20 of FIG. 1, in block diagram form. With reference to FIG. 3, the user device 20 includes a central processing unit (CPU) 20A. The central processing unit (CPU) 20A may be a microprocessor, a microcomputer, a minicomputer, a macro-computer, or a mainframe computer, depending upon the application.

The user device 20 also includes a read only memory (ROM) device 20B and a random access memory (PAM) device 20C which are also connected to the CPU 20A. The user device 20 also includes a user input device(s) 20D which can include any one or more of a keyboard, a scanner, a user pointing device, such as, for example, a mouse, an audio input device, a touch pad, etc., which input device(s) 20D is also connected to the CPU 20A.

The user device 20 also includes a display device 20E, such as a display monitor and/or a display screen for providing the herein-described information to the individual or shopper. The display device 20E is also connected to the CPU 20A. The user device 20 can also include an output device 20F, such as a printer, a display device, and/or a modem, for outputting, in either or both of hard copy form or electronic form, any of the information which is described herein as being provided by, or at, the user device 20. The output device 20F can also be connected to the CPU 20A.

The user device 20 can also include a database(s) 20G, which can contain any data and/or information which may be required, and/or which may be desired, for performing any of the functionality and/or processing routines described herein as being performed by the user device 20 and/or the apparatus 100. The database 20G can also be connected to the CPU 20A.

The user device 20 can also include a receiver 20H for receiving data and/or information, including any of the herein-described information, and/or any of the other information described herein as being provided to the user device 20, from any of the central processing computer systems 10, from any of the administrative computer systems 30, and/or from any of the other user devices 20 described herein. The receiver 20H can also be connected to the CPU 10A.

The user device 20 can also include a transmitter 20I for transmitting data and/or information, including any of the herein-described information, and/or any of the other information described herein as being provided from the user device 20, to any of the central processing computer systems 10, to any of the administrative computer systems 30, and/or to any of the other user devices 20 described herein. The transmitter 20I can also be connected to the CPU 20A.

Figure 4:
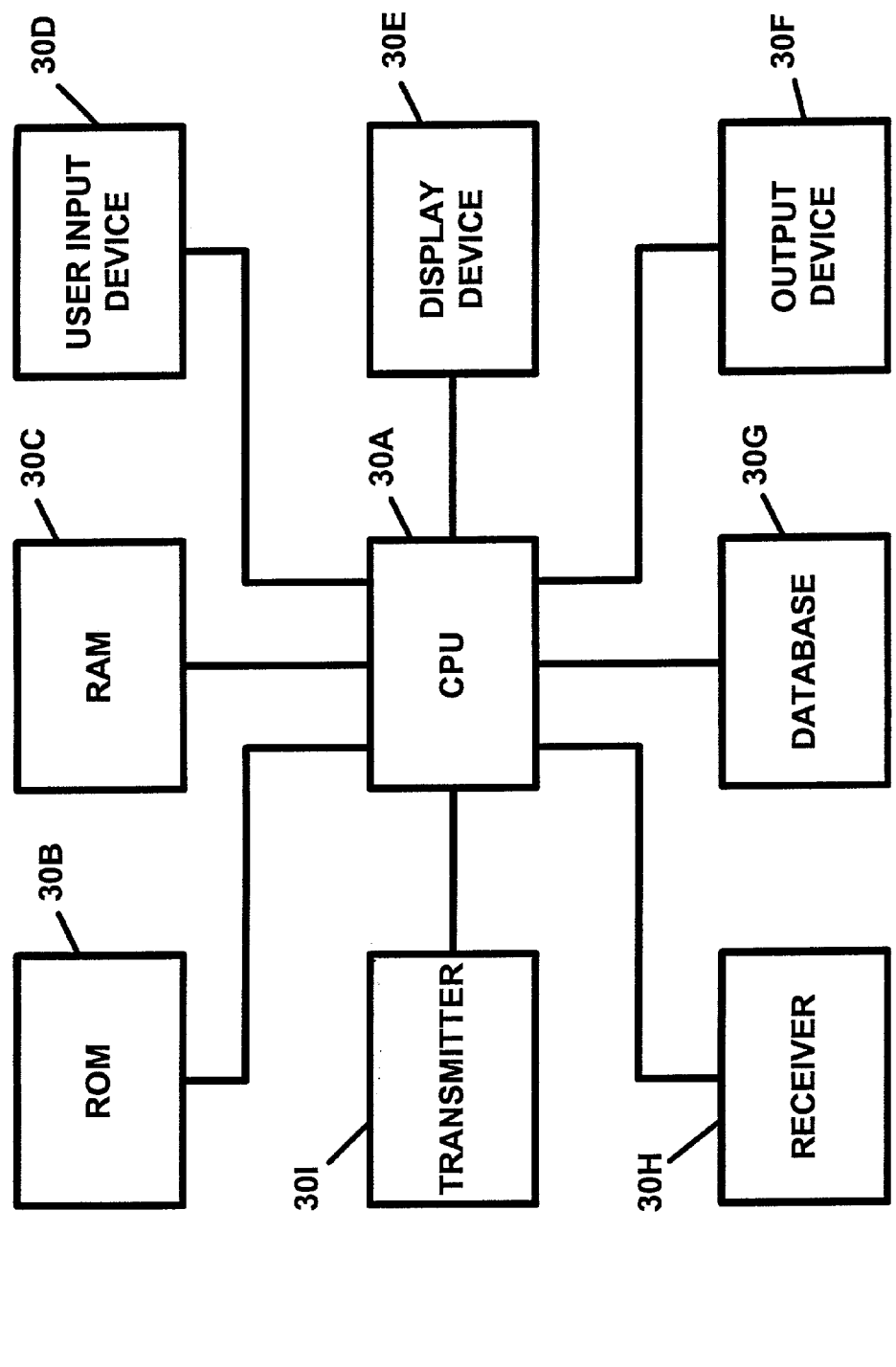
FIG. 4 illustrates the administrative computer system of FIG. 1, in block diagram form.

FIG. 4 illustrates the administrative computer system 30 of FIG. 1, in block diagram form. With reference to FIG. 4, the administrative computer system 30 includes a central processing unit (CPU) 30A. The central processing unit (CPU) 30A may be a microprocessor, a microcomputer, a minicomputer, a macro-computer, or a mainframe computer, depending upon the application.

The administrative computer system 30 also includes a read only memory (ROM) device 30B and a random access memory (RAM) device 30C which are also connected to the CPU 30A. The administrative computer system 30 also includes a user input device(s) 30D which can include any one or more of a keyboard, a scanner, a user pointing device, such as, for example, a mouse, an audio input device, a touch pad, etc., which input device(s) 30D is also connected to the CPU 30A.

The administrative computer system 30 also includes a display device 30E, such as a display monitor and/or a display screen for providing the herein-described information to the operator of the administrative computer system 30. The display device 30E is also connected to the CPU 30A. The administrative computer system 30 can also include an output device 30F, such as a printer, a display device, and/or a modem, for outputting, in either or both of hard copy form or electronic form, any of the information which is described herein as being provided by, or at, the administrative computer system 30. The output device 30F can also be connected to the CPU 30A.

The administrative computer system 30 can also include a database(s) 30G, which can contain any data and/or information which may be required, and/or which may be desired, for performing any of the functionality and/or processing routines described herein as being performed by the administrative computer system 30 and/or the apparatus 100.

The database 30G can contain any of the data and/or information described herein as being contained in the database 10G of the central processing computer 10 for any number of central processing computers 10 and/or for any number of, or for any chain of, any of the respective establishment(s), store(s), retail store(s), wholesale store(s), wholesaler(s), and/or commercial establishment(s).

The database 30G can contain data and/or information regarding the various goods, products, and/or services provided by any number of, or any chain of, any of the respective establishments), store(s), retail store(s), wholesale store(s), wholesalers), and/or commercial establishments(s), which is associated with the respective administrative computer system 30. The database 30G can contain data and/or information regarding the price of, the cost of, the prices paid for, or wholesale prices paid for, the respective goods, products or services.

The database 30G can also contain data and/or information regarding the retail or resale prices of the respective goods, products, or services, the profit margins corresponding to the respective goods, products, or services, sale prices for the respective goods, products, or services, sale times for the respective goods, products, or services, and/or any other data and/or information regarding the respective goods, products or services.

The database 30G can also contain information regarding dates and/or times of sales pertaining to any of the respective goods, products, or services, which are or which can be offered by and/or which are provided by, the respective establishment(s), store(s), retail store(s), wholesale store(s), wholesaler(s), and/or commercial establishment(s), or group(s) or chain of same.

The database 30G can also contain data and/or information regarding the operating data and/or information for the respective establishment(s), store(s), retail store(s), wholesale store(s), wholesaler(s), and/or commercial establishment(s), or groups or chains of same, inventory cost data for the establishment(s), store(s), retail store(s), wholesale store(s), wholesaler(s), and/or commercial establishment(s), or groups or chains of same, operating expense data and/or information for the respective establishment(s), store(s), retail store(s), wholesale store(s), wholesaler(s), and/or commercial establishment(s), or groups or chains of same, and/or data and/or information for administering sales offerings for the respective establishment(s), store(s), retail store(s), wholesale store(s), wholesaler(s), and/or commercial establishment(s), or groups or chains of same.

The database 30G can also contain data and/or information regarding operating expense requirements for a specific time period for a respective establishment(s), store(s), retail store(s), wholesale store(s), wholesaler(s), and/or commercial establishment(s), or groups or chains of same, profit margins for the various goods, products, or services, offered by or provided by the respective establishment(s), store(s), retail store(s), wholesale store(s), wholesaler(s), and/or commercial establishment(s), or groups or chains of same, instantaneous profit margins for a present price or present sale price of any goods, products, or services, offered by or provided by the respective establishment(s), store(s), retail store(s), wholesale store(s), wholesaler(s), and/or commercial establishment(s), or groups or chains of same, and/or any other data and/or information relating to the above information.

The database 30G can also contain information regarding available inventory, and/or expected inventory, of or for the respective establishment(s), store(s), retail store(s), wholesale store(s), wholesaler(s), and/or commercial establishment(s), or groups or chains of same, as well as inventory or expected inventory of other establishments, stores, retail stores, wholesale stores, wholesalers, and/or commercial establishments, or groups or chains of same. The database 30G can also contain data and/or information regarding the revenues received by a respective establishment(s), store(s), retail store(s), wholesale store(s), wholesaler(s), and/or commercial establishment(s), or groups or chains of same, during a given time period, business day, and/or any other time interval or period.

The database 30G can also contain real-time sales revenue information, real-time cumulative sales revenue information, real-time cumulative cost of sold inventory or cost of goods, products, or services, sold information, real-time cumulative profit or loss information, and/or any other data and/or information for or regarding the operating state or states of a respective establishment(s), store(s), retail store(s), wholesale store(s), wholesaler(s), and/or commercial establishment(s), or groups or chains of same, for any desired time periods.

For example, the database 30G can contain data and/or information regarding the revenues, cost of inventory sold, profit or loss information, for any given or selected time period for which a respective establishment(s), store(s), retail store(s), wholesale store(s), wholesaler(s), and/or commercial establishment(s), or groups or chains of same, is operating.

The database 30G can also contain data and/or information regarding establishment(s), store(s), retail store(s), wholesale store(s), wholesaler(s), and/or commercial establishment(s), which may be participating in affiliated marketing programs which can be provided by the apparatus and methods of the present invention. The database 10G can contain information regarding any establishment(s), store(s), retail store(s), wholesale store(s), wholesaler(s), and/or commercial establishment(s) which desire to participate with any other establishment(s), store(s), retail store(s), wholesale store(s), wholesaler(s), and/or commercial establishment(s) in an affiliated marketing relationship.

The data and/or information which is stored in the database 30G can include identification information (i.e. name, description of goods and/or services provided, prices of goods and/or services provided, etc.), contact information (i.e. address, web address, telephone number, fax number, e-mail address, etc.), affiliated marketing information (i.e. types of goods and/or services involved, information regarding the type or kind of information, types of affiliated marketing partners, terms of any affiliated marketing agreements (i.e. referral procedure and manner, referral fees, manner in which referral fees are paid, etc.), programs in which the respective establishment(s), store(s), retail store(s), wholesale store(s), wholesaler(s), and/or commercial establishment(s) are participating in and/or are involved in, for any of the establishment(s), store(s), retail store(s), wholesale store(s), wholesaler(s), and/or commercial establishment(s) participating in any affiliated marketing activities pursuant to the present invention.

The database 30G, and/or the administrative computer system 30 can be linked to and/or can receive information from the respective cash register system, cash register computer system, sales recording or sales registering system or computer system, and/or an accounts receivable system or computer system, for or associated with the respective establishment(s), store(s), retail store(s), wholesale store(s), wholesaler(s), and/or commercial establishment(s), or groups or chains of same.

The database 30G, and/or the administrative computer system 30 can also be linked to and/or can receive information from the inventory computer system of the respective establishments), store(s), retail store(s), wholesale store(s), wholesalers), and/or commercial establishments), or groups or chains of same. The database 30G can also be linked to and/or can receive information from any other central processing computer systems 10, computer system(s), administrative computer system(s), and/or management information computer system(s), of the respective establishments), store(s), retail store(s), wholesale store(s), wholesalers), and/or commercial establishments), or groups or chains of same.

The database 30G can also contain information regarding any individuals or shoppers who or which may have accounts, credit accounts, charge accounts, debit accounts, and/or financial accounts, with the respective establishment(s), store(s), retail store(s), wholesale store(s), wholesaler(s), and/or commercial establishment(s), or groups or chains of same. The database 30G can contain data and/or information regarding the individuals or shoppers, include but not limited to, the name, names, address, telephone number, facsimile number, e-mail address, and account information, for or corresponding to each of the individuals or shoppers who utilize the apparatus 100.

The database 30G can also contain data and/or information regarding the shopping or purchasing history or histories, buying patterns, and/or other information for or regarding any of the individuals or shoppers who or which utilize the apparatus 100 of the present invention.

The database 30G can also contain data and/or information for pricing options to buy or options to sell any of the goods, products, and/or services, which are or which can be offered by or provided by the respective establishment(s), store(s), retail store(s), wholesale store(s), wholesaler(s), and/or commercial establishment(s), or groups or chains of same.

The database 30G can also contain any other data and/or information which may be needed and/or desired for performing any of the processing routines and/or functionality described herein as being provided by the administrative computer system 30 and/or apparatus 100. The database 30G can also be connected to the CPU 30A.

The database 30G can also be linked to and/or be connected to any of the central processing computer systems 20 described herein.

The administrative computer system 30 can also include a receiver 30H for receiving data and/or information, including any of the herein-described information, and/or any of the other information described herein as being provided to the administrative computer system 30 from any of the central processing computer systems 10, from any of the user devices 20, and/or from any of the other administrative computer systems 30, described herein. The receiver 30H can also be connected to the CPU 30A.

The administrative computer system 30 can also include a transmitter 30I for transmitting data and/or information, including any of the herein-described information, and/or any of the other information described herein as being provided from the administrative computer system 30 to any of the central processing computer systems 10, to any of the user devices 20, and/or to any of the other administrative computer systems 30, described herein. The transmitter 30I can also be connected to the CPU 30A.

The apparatus 100 and method of the present invention can be utilized in a number of preferred embodiments in order to facilitate transactions.

In a preferred embodiment, the apparatus 100 can be utilized in order to allow an individual or shopper to bid or make an offer for a good, a product, or a service, at, in, or near the vicinity of, an establishment or store. It is envisioned that user devices 20 can be located at computers, computer terminals, kiosks, and/or communication devices, inside, or in the vicinity of, an establishment or store.

An individual or shopper can utilize the central processing computer system 10 associated with the establishment or store via a user device. The individual or shopper can select a good(s), a product(s), or a service(s), which he or she desires to purchase and place a bid or make an offer for same. The central processing computer system 10 can receive and process the individual's or the shopper's bid or offer, and determine whether or not to accept it.

If the bid or offer is acceptable, the central processing computer system 10 can generate a customized coupon and transmit same to the user device 20 wherein it can be printed out at the user device 20. Thereafter, the individual or shopper can use the coupon in a transaction at the establishment or store.

Figure 5:
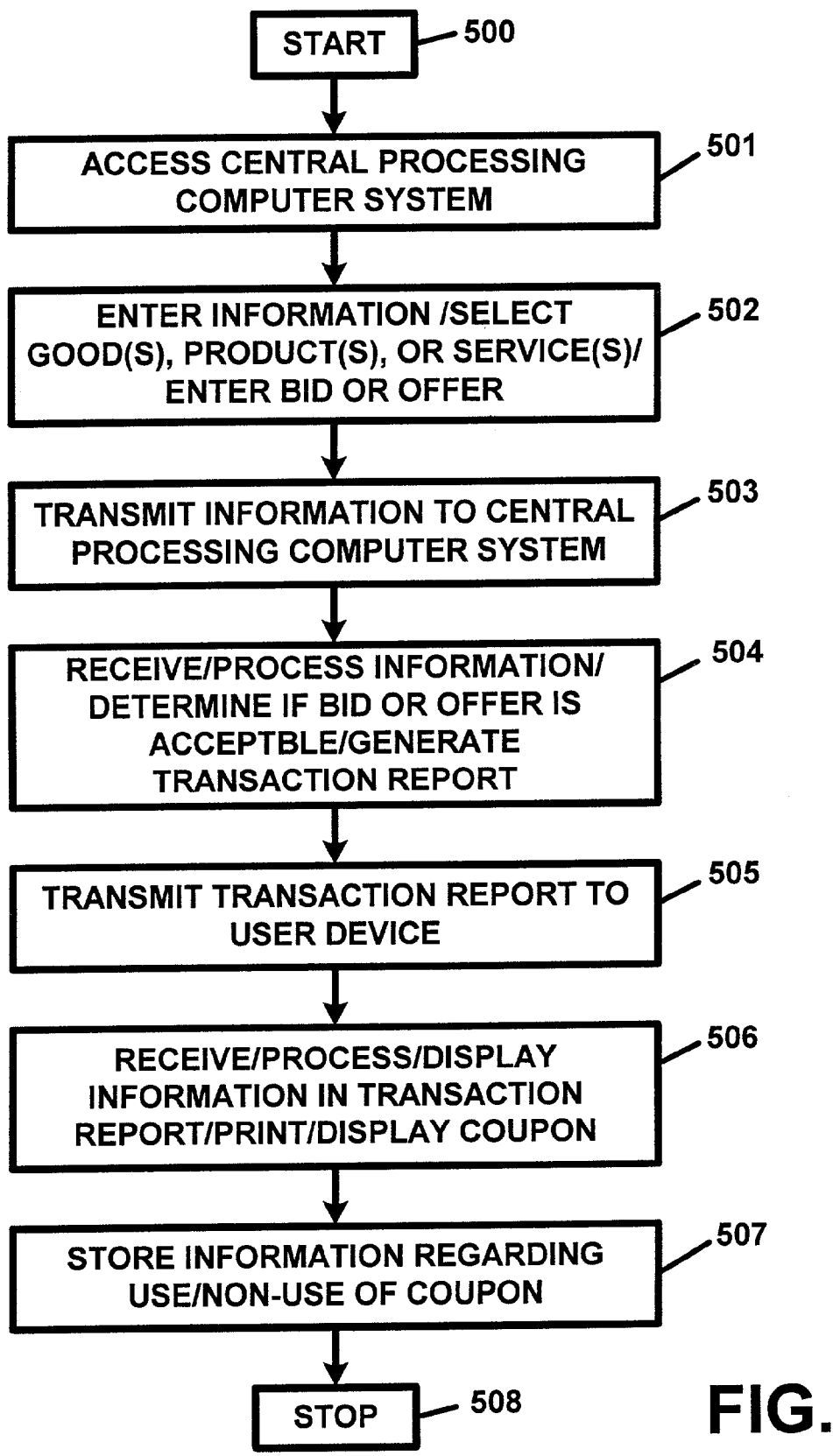
FIG. 5 illustrates a preferred embodiment method for utilizing the apparatus of the present invention, in flow diagram form.

FIG. 5 illustrates a preferred embodiment method for utilizing the apparatus 100, in flow diagram form. With reference to FIG. 5, the operation of the apparatus commences at step 500. At step 501, the individual or shopper (hereinafter referred to as "shopper") can access the central processing computer 10 via the user device 20.

At step 502, the shopper can enter information regarding the particular good(s), product(s), or service(s), which he or she desired to purchase. At step 502, the user can select the particular good(s), product(s), or service(s) which he or she desires to purchase. At step 502, the shopper can also enter a bid price of offer price which the shopper desires to pay for the particular good(s), product(s), or service(s).

At step 503, the shopper entered information and bid or offer information can be transmitted to the central processing computer system 10. At step 504, the central processing system computer 10 will receive and process the shopper entered information. At step 504, the central processing computer 10 can determine any one or more of whether the particular good(s), product(s), or service(s), is available at the establishment or store, the cost of the particular good(s), product(s), or service(s) to the establishment or store which can include the wholesale price paid by the establishment or store, the total cost of purchasing, carrying, or storing, the particular good(s), product(s), or service(s) to the establishment or store, the cost of doing business involving the particular good(s), product(s), or service(s), the amount of overhead expenses allocated to the particular good(s), product(s), or service(s), and/or any other related information.

At step 504, the central processing computer system 10 can also process the shopper entered information in conjunction with any one or more of the sales of the establishment or store, the sales of the establishment or store during a given time period, the revenues of the establishment or store, the revenues of the establishment or store during a given time period, the profits or losses of the establishment or store, the profits or losses of the establishment or store for a given time period, and/or any other information which can be utilized by the central processing computer system 10 in processing the shopper's bid or offer.

At step 504, the central processing computer 10 can determine if the shopper's bid or offer is acceptable. The central processing computer 10 can determine if the bid or offer is acceptable in view of any one of more of the cost of the particular good(s), product(s), or service(s) to the establishment or store, the wholesale price paid by the establishment or store, the total cost of purchasing, carrying, or storing, the particular good(s), product(s), or service(s) to the establishment or store, the cost of doing business involving the particular good(s), product(s), or service(s), the amount of overhead expenses allocated to the particular good(s), product(s), or service(s), and/or any other related information, the sales of the establishment or store, the sales of the establishment or store during a given time period, the revenues of the establishment or store, the revenues of the establishment or store during a given time period, the profits or losses of the establishment or store, and/or the profits or losses of the establishment or store for a given time period.

The central processing computer 10 can also determine if the bid or offer is acceptable in view of any one of more of the store's sales of the day, the store's sales of the week, the store's sales of the month, the store's sales of the quarter, the store's sales of the year, the store's sales of past sales days or sales events, the volume of customers in a store at a given time, the volume of customers in a store during a day, the store's profits, profit targets, and/or profit margins for the day, the store's profits, profit targets, and/or profit margins for the week, the store's profits, profit targets, and/or profit margins for the month, the store's profits, profit targets, and/or profit margins for the quarter, the store's profits, profit targets, and/or profit margins for the year, the store's profits, profit targets, and/or profit margins for past sales days or sales events, the store's inventory for the day, the store's inventory for the week, the store's inventory for the month, the inventory for the quarter, the store's inventory for the year, and/or the store's inventory for past sales days or sales events.

The central processing computer 10 can also determine if the bid or offer is acceptable in view of a bidding customer's past shopping history, the bidding customer's past shopping history at the store or store chain, the bidding customer's credit history, the bidding customer's credit history at the store, the bidding customer's store credit history, the bidding customer's shopping profile, the bidding customer's shopping history, the bidding customer's shopping spending habits, and/or the bidding customer's shopping spending amounts and/or average spending amounts.

The central processing computer 10 can also determine if the bid or offer is acceptable in view of a bidding customer's past shopping behavior involving and/or related to past accepted bids, the bidding customer's past shopping behavior regarding whether the bidding shopper purchased other goods and/or services in conjunction with and/or in addition to purchasing the good(s) and/or service(s) which was the subject of an accepted bid (i.e. whether a shopper purchased another good or service in addition to the good or service which was also purchased as a result of an accepted bid), and/or the bidding customer's shopping behavior and/or responses to additional discount offers, such as, for example, discounts offered at a checkout and/or at other times during a shopping experience.

At step 504, the central processing computer system 10 can generate a transaction report which can contain information regarding whether the shopper's bid or offer has been accepted or whether the shopper's bid or offer has been rejected. The transaction report can also contain a counteroffer from the establishment or store.

In the case of a shopper's bid or offer being accepted or a counteroffer being extended by the establishment or store, the transaction report can contain an electronic coupon. At step 505, the transaction report can be transmitted to the user device 20. At step 506, the user device 20 can be process and display the information contained in the transaction report. If the shopper's bid or offer has been accepted or if the establishment or store has issued a counteroffer, the user, at step 506, can print out the coupon via the output device 20F. Thereafter, the shopper can then utilize the coupon in a transaction involving the particular good(s), product(s), or service(s). The coupon can also be an electronic coupon which can be stored and/or displayed on the user device 20. The electronic coupon can be displayed on the display device 20E. In this manner, the electronic coupon can be presented to a store employee such as at the time of checkout and/or be made available for scanning at a checkout counter.

In the preferred embodiment of FIG. 5, as well as in any and/or all of the other embodiments described herein, the coupon and/or electronic coupon which can be provided to any shoppers, customers and/or users of the present invention, can include incentive features. The incentive features can include a pre-determined discount if the coupon or electronic coupon is utilized within a certain time period. The incentive(s) can include a predetermined percent discount if the coupon or electronic coupon is utilized within a pre-specified time period, a predetermined price reduction if the coupon or electronic coupon is utilized within a pre-specified time period, a predetermined discount if the coupon or electronic coupon is utilized in conjunction with purchases of multiple goods and/or services, etc. (i.e. 15% off a purchase if the coupon or electronic coupon is used within one hour of issue, $25.00 off a purchase of a particular good or service if the coupon of electronic coupon is used with a certain time period of issuance, 20% discount on an entire purchase if an additional purchase of another good or service is made). The coupon or electronic coupon can also include any other incentives (i.e. additional coupons and/or savings if any other store dictated conditions are satisfied or met by the user or shopper, etc.)

At step 507, any information regarding whether the coupon has been utilized, or whether the coupon has not been utilized, within a certain time period and/or otherwise, can be stored by the apparatus 100 and/or the central processing computer system 10 for later use in any appropriate manner. Thereafter, the operation of the apparatus 100 will cease at step 508.

In another preferred embodiment, at step 506, the shopper can pay or pre-pay for the respective good(s), product(s), or service(s), via the user device 20. In this embodiment, the central processing computer system 10 can process the transaction for the shopper. The central processing computer system 10 can process any financial transactions involving the transaction and/or can effectuate any financial transactions involving any of the financial accounts associated with the respective shopper and the establishment or store.

In any and/or all of the embodiments described herein, the central processing computer system 10 can administer and/or manage financial accounts for any of the shoppers and/or establishments or stores described herein. The central processing computer system 10 can also effectuate financial transactions between, to, or from, any of the financial accounts associated with any of the herein-described shoppers, establishments, or stores.

The central processing computer system 10 can then generate a pre-paid coupon or transaction receipt and transmit same to the user device 20. The shopper can then print out the pre-paid coupon or transaction receipt via the output device 20F of the user device 20. The shopper can thereafter, purchase the respective good(s), product(s), or service(s), with the pre-paid coupon or transaction receipt.

In another preferred embodiment, the above-described method of FIG. 5 can be performed by the shopper on a user device 20 which is located at the point-of-sale, at the point-of-transaction, at the check-out register, while waiting to check out. In another preferred embodiment, the user device 20 can be a wireless or mobile communication device or computer (i.e. personal digital assistant, hand-held computer, telephone, wireless telephone, palm-top device, and/or any other communication device) which the user can carry on his or her person at any time, and/or at all times, while shopping in the establishment or store.

In another preferred embodiment, the above-described method of FIG. 5 can also be performed by the shopper on a user device 20 which can be a personal computer, telephone, communication device, from home, from work, and/or from any other location which is remote from the establishment or store.

In another preferred embodiment of the method of FIG. 5, the shopper, at step 502, the shopper can enter a request to purchase an option to purchase, or options to purchase, the particular good(s), product(s), or service(s), at a certain price or at certain prices. In this embodiment, the central processing computer system 10, at step 504, can determine whether to sell the option or options to the shopper.

At step 504, the central processing computer system 10 can also utilize financial option pricing data and/or information, which is known to those skilled in the art of financial option pricing, in order to determine the price or prices of the option or options and/or in order to determine whether or not to provide an options or options to the shopper. Applicant hereby incorporates by reference herein the subject matter and teachings of *Options, Futures, and Other Derivatives*, Third Edition, John C. Hull, Prentice Hall, 1997 and *Futures, Options & Swaps*, Second Edition, Robert W. Kolb, Blackwell publishers, 1997.

In another preferred embodiment, the central processing computer system 10 can determine whether or not to accept a shopper's bid or bids based upon the sales or revenues which the establishment or store has made or received during a given time period, based upon the profit margins of previous sales made, based upon profit targets desired to be attained by the establishment or store, and/or based upon any other operation criteria of the establishment or store.

In another preferred embodiment of the method of FIG. 5, the central processing computer system 10 can, at any time, revise or change the prices of any of the goods, products, or services, which are or which can be offered or provided by the establishment or store. The central processing computer system 10 can continuously process sales data and/or information, revenue data and/or information, profit or loss data and/or information, for a given time period and calculate price changes in order to increase sales of any of the goods, products, or services.

For example, if, during the course of a sales event, the central processing computer system 10, after receiving and processing sales transaction information, determines that certain goods, products, or services are not selling as expected, an/or that the sales event is not generating expected and/or desired sales revenues or profits, the central processing computer system 10 can dynamically change or revise the price or prices of certain goods, products, or services. For example, if, in a department store, certain men's or women's clothing is not selling as desired, the central processing computer system 10 can determine an additional price reduction for the respective goods, products, or merchandise. In this manner, the central processing computer system 10 can provide or mange a dynamically changing sales or promotional event.

In another preferred embodiment of the method of FIG. 5, the user can enter a bid or offer is not accepted by the central processing computer system 10, the central processing computer system 10 can, at step 504, store the shopper's bid or offer. At step 504, the central processing computer system 10 can continuously compare any price changes or reductions against the stored bids or offers. If, a bid or offer should become acceptable in view of a price change or price reduction, the central processing computer system 10 can, at step 504, generate a notification report containing information for notifying the shopper that his or her bid or offer is now acceptable.

The notification report can be transmitted to the shopper as a beeper or pager message, as a text message, as a voice message, as an e-mail message, and/or as an electronic transmission, which could be transmitted to the shopper's beeper, pager, wireless telephone, personal digital assistant, hand-held device, palm-top device, or other communication device.

It is envisioned that the shopper can register with the central processing computer system 10 and provide contact information which can include any one or more of beeper number, pager number, wireless telephone number, email address, etc., at any time beforehand and/or can provide the respective contact information at the time at which he or she enters or posts his or her bid or offer with the central processing computer system 10. In this manner, the apparatus 100 of the present invention can provide notification to the shopper of price changes, price reductions, and/or accepted bids or offers, at any time while the shopper may be shopping in the establishment or store.

Figure 6:
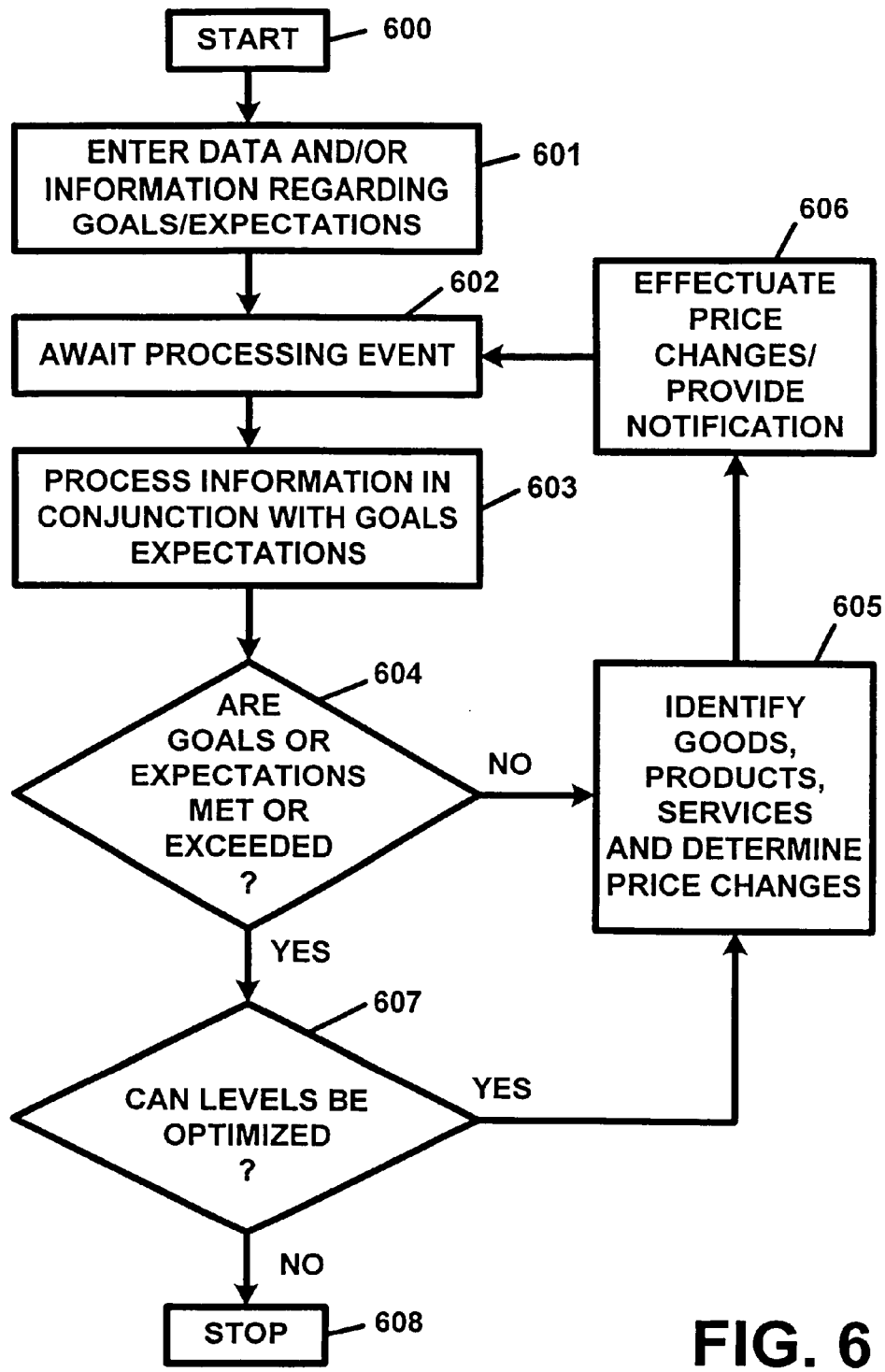
FIG. 6 illustrates another preferred embodiment method for utilizing the apparatus of the present invention, in flow diagram form.

In another preferred embodiment, the central processing computer can continuously manage and/or administer sales activities and/or can provide price changes or price reductions in order to meet sales goals, revenue goals, or profit goals and/or in order to minimize losses. FIG. 6 illustrates another preferred embodiment method for utilizing the apparatus 100 of the present invention.

In the embodiment of FIG. 6, the apparatus 100, and in particular, the central processing computer system 10 and/or the administrative computer system 30 can be programmed with expected sales, revenues, profit goals, loss minimization goals, costs for goods, products, or services, offered by or provided by establishment or store, expected or actual overhead costs, fixed costs, variable costs, and/or any other business operating parameter data and/or information, for any establishment or store, or for a group or chain of same.

The respective central processing computer system 10 and/or the administrative computer system 30 can periodically and/or upon the occurrence of certain events, monitor and analyze the sales, revenues, profits, or losses, respectively received or incurred by the establishment or store, or by a group or chain of same. The respective central processing computer system 10 and/or the administrative computer system 30 can, depending upon the results of the analysis, identify goods, products, or services for either price reductions or price increases.

The respective central processing computer system 10 and/or the administrative computer system 30 can, also schedule sales or sales promotion times and provide notification to shoppers electronically, such as by transmitting a sales notification message to the shopper's wireless telephone, personal communication device, personal digital assistant, beeper or pager, and/or any other communication device.

The respective central processing computer system 10 and/or the administrative computer system 30 can also update the sales computers or transaction computers of the establishment or store, provide notification to sales persons, electronically modify electronic price displays in the establishment or store, and/or perform any other related activities or functionality.

For example, if sales revenues for a particular day or sales event day are not meeting expectations, the respective central processing computer system 10 or administrative computer system 30 can identify goods, products, or services, for price reduction and effectuate a sales offering of same at any time.

The respective central processing computer system 10 and/or the administrative computer system 30 can also update the sales computers or transaction computers of the establishment or store, change or modify electronic price displays, update electronic sales bulletin boards, notify sales personnel of the price changes, and/or perform any other tasks. In another appropriate setting, the respective central processing computer system 10 and/or the administrative computer system 30 can identify goods, products, or services, for price increases in an effort to increase revenues, profits or reduce losses.

In this manner, a dynamic sales environment can be facilitated by the apparatus 100 of the present invention.

The embodiment of FIG. 6 is described as being performed by the central processing computer system 10. However, it is to be understood that the embodiment of FIG. 6 can also be performed by the administrative computer system 30.

With reference to FIG. 6, the operation of the apparatus 100 commences at step 600. At step 601, the store manager or other authorized individual can enter or program data and/or information regarding goals or expectations regarding sales, revenues, profits, or losses, into the central processing computer 10. The central processing computer can also, at step 601, process and store the entered data and/or information.

At step 602, the central processing computer 10 will await the occurrence of a processing event. The processing event can occur upon the expiration of a time interval, such as, for example, a pre-specified number of minutes, an hour, a pre-specified number of hours, a day, a pre-specified number of days.

The processing event can also be the meeting of a sales level, a revenue level, a profit level, a loss level, the start of an accounting period, the end of a sales event, the start of an accounting period, the end of an accounting period, a receipt of a delivery of any goods, products, or services, the selling of a good, product or service, and/or the selling out of a good, product, or services. The processing event can also be selected at and/or triggered at any time by a store manager or other authorized employee.

In the embodiment of FIG. 6, the central processing computer system 10 and/or the administrative computer system 30 can monitor the sales revenues received by an establishment, store, or by a group or chain of same, the costs of goods sold to an establishment, store, or group or chain of same, the profits or losses of establishment, store, or group or chain of same, and/or any other data and/or information regarding the business operations of the establishment, store, or group or chain of same.

Upon the occurrence of the processing event, the central processing computer system 10 will, at step 603, process the information concerning the respective sales levels, revenue levels, profits earned or profit levels, losses incurred, etc., in conjunction with the respective goals or expectations relating to same. At step 604, the central processing computer system 10 will determine whether any one or more of the respective sales levels, revenue levels, profits earned or profit levels, losses incurred, etc., meet or exceed the respective goals or expectations which were set for same.

If, at step 604, the central processing computer system 10 determines that any one or more of the respective sales levels, revenue levels, profits earned or profit levels, losses incurred, etc., do not, or did not, meet or exceed, or are not meeting or exceeding, the respective goals or expectations which were set for same, then the operation of the central processing computer system 10 will proceed to step 605.

At step 605, the central processing computer 10 can identify the particular goods, products, or services, for which prices should be reduced and/or for which prices should be increased. The central processing computer system can also determine the amounts or percentages of the respective price reductions or decreases and/or the amounts or percentages of the respective price increases. The central processing computer system 10 can also determine new prices or promotional prices for any of the respective goods, products, or services.

At step 605, the central processing computer system 10, in performing the described identification and price modification determinations concerning the respective goods, products, or services, can utilize data and/or information concerning the profit margins for the respective goods, products, or services, the number or quantities of the respective goods, products, or services previously sold and their respective selling prices and/or profit margins, the number or quantity of the respective goods, products, or services currently being held in inventory or stock, and/or any fixed, variable, or overhead costs associated with same.

At step 605, the central processing computer system 10, in performing the described identification and price modification determinations concerning the respective goods, products, or services, can also utilize data and/or information concerning the past sales history or histories regarding and/or relating to the establishment or store and/or the respective goods, products, or services, past consumer buying behavior or consumer purchasing histories regarding the respective goods, products, or services, and/or consumer response or reactions to sales or promotion events.

The central processing computer system 10 can also, at step 605, utilize statistical, probabilistic, and/or forecasting, models and/or routines, data and/or information, in order to identify goods, products or services, for respective price changes, reductions or increases, as well as to determine the respective price changes, reductions or increases.

Thereafter, the operation of the central processing computer system 10 will proceed to step 606 and the central processing computer system 10 will effectuate the respective price changes, reductions, or increases, for the goods, products, or services, which were identified during step 605. At step 606, the central processing computer system 10 will also effectuate the changing of the prices in the respective store computers, price databases, sales computers, and/or transaction computers.

The central processing computer system 10 can also, at step 606, change the prices which are displayed on electronic display devices or shopping bulletin boards throughout the establishment or store, in the departments, on the merchandise racks, on the merchandise itself, and/or at the check-out register or related devices. At step 606, the central processing computer system 10 can also provide notification of the price changes to sales personnel or employees of the establishment or store.

At step 606, the central processing computer system 10 can also provide notification to a shopper or shoppers who have either previously bid on, or made offers for, goods, products, or services, for which prices have been changed. The central processing computer system 10 can also provide notification to a shopper or shoppers who have requested to be notified regarding price changes for any goods, products, or services.

The notification can be in on the form of a notification report which can be generated by the central processing computer system 10 ad which can include information regarding the goods, products, or services, and the new prices of same. The notification report can also contain an electronic coupon or coupons for the respective goods, products, or services.

The notification report can be transmitted as any one or more of a beeper message, a pager message, a telephone message, a pre-recorded telephone message, an email message, an instant messaging service message, and/or as any other electronic transmission or message, and can be received by, and/or retrieved from, any of the herein-described user devices 20.

It is envisioned that shoppers can request such notification at or from the user device 20 located at or near the establishment or store and/or at or from a home or personal computer or other communication device. In this manner, a shopper can be apprised of price changes for particular goods, products, or services, as they are occurring.

The central processing computer system 10 can provide any of the herein-described notifications in any appropriate form or manner. The central processing computer system 10 can also provide any of the herein-described notifications in any one or more of a real-time manner, a time delayed manner, and/or in combination of same.

Thereafter, the operation of the central processing computer system 10 will proceed to step 602 and the central processing computer system 10 will await a next processing event after which the central processing computer system 10 can evaluate the effectiveness of the actions taken at steps 605 and 606.

If, at step 604, the central processing computer system 10 has met or exceeded, and/or is meeting or exceeding, the respective goals or expectations which were set for the respective sales levels, revenue levels, profits earned or profit levels, losses incurred, etc., then the operation of the central processing computer system 10 will proceed to step 607. At step 607, the central processing computer system 10 will determine whether any one or more of the respective sales levels, revenue levels, profit levels can be increased and/or further optimized and/or whether losses can be further reduced or minimized.

If, at step 607, the central processing computer system 10 determines that any one or more of the respective sales levels, revenue levels, profit levels can be increased and/or further optimized and/or whether losses can be further reduced or minimized, then the operation of the central processing computer system 10 will proceed to step 605 and the above-described operation, at steps 605 and 606, will be performed by the central processing computer system 10.

If, however, at step 607, the central processing computer system 10 determines that any one or more of the respective sales levels, revenue levels, profit levels can not be increased and/or can not be further optimized and/or whether losses can not be further reduced or minimized, then the operation of the central processing computer system 10 will cease at step 608. Thereafter, the operation of the apparatus 100 can be repeated upon the occurrence of a next processing event.

In another preferred embodiment of the method of FIG. 5, the central processing computer system 10 can utilize any of the data and/or information described herein as being utilized at steps 603 and 604 of the embodiment of FIG. 6 in order to determine whether the shopper's bid or offer is acceptable. In this regard, the central processing computer system 10, at step 504, can determine whether a shopper's bid or offer is acceptable by processing same in conjunction with data and/or information concerning the profit margins for the respective goods, products, or services, the number or quantities of the respective goods, products, or services previously sold and their respective selling prices and/or profit margins, the number or quantity of the respective goods, products, or services currently being held in inventory or stock, and/or any fixed, variable, or overhead costs associated with same.

The central processing computer system 10, at step 504, can also utilize data and/or information concerning the past sales history or histories regarding and/or relating to the establishment or store and/or the respective goods, products, or services, past consumer buying behavior or consumer purchasing histories regarding the respective goods, products, or services, consumer response or reactions to sales or promotion events, and/or statistical, probabilistic, and/or forecasting, models, routines, data and/or information.

In another preferred embodiment, the apparatus 100 of the present invention can be utilized in order to provide and/or administer an affiliated marketing program(s) between any of the establishment(s), store(s), retail store(s), wholesale store(s), wholesaler(s), and/or commercial establishment(s), who or which utilize the present invention.

It is envisioned that any number of establishment(s), store(s), retail store(s), wholesale store(s), wholesaler(s), and/or commercial establishment(s), can enter into an affiliated marketing program or programs with any number of establishment(s), store(s), retail store(s), wholesale store(s), wholesaler(s), and/or commercial establishment(s). The central processing computer 10 and/or the administrative computer 30, and/or any number of central processing computers 30 and/or administrative computers 30, can be utilized in order to administer the affiliated marketing program or programs which can be provided by the apparatus and methods of the present invention.

Information regarding each establishment, store, retail store, wholesale store, wholesaler, and/or commercial establishment, participating in the affiliated marketing program or programs, along with the identification regarding each establishment, store, retail store, wholesale store, wholesaler, and/ or commercial establishment, the respective goods, products, and/or services, offered by and/or provided by the respective establishment, store, retail store, wholesale store, wholesaler, and/or commercial establishment, descriptions and/or prices for the respective goods, products, and/or services, information regarding any of the users or shopper who utilize the apparatus and method of the present invention, information regarding the affiliated marketing program agreements which exist between the respective establishment, store, retail store, wholesale store, wholesaler, and/or commercial establishment, information regarding the referral fees and the terms and/or conditions regarding the earning of, and/or the payment of, referral fees, and/or any other information, can be stored in the respective database(s) 10H of the central processing computer(s) 10 and/or in the database(s) 30H of the administrative computer(s) 30.

In another preferred embodiment, the apparatus 100 can be utilized in order to facilitate and/or administer an affiliated marketing relationship wherein affiliated marketing referrals can be provided to a shopper in response to a shopper's request for information for, and/or a bid for, a good, product, or service.

Figure 7A:
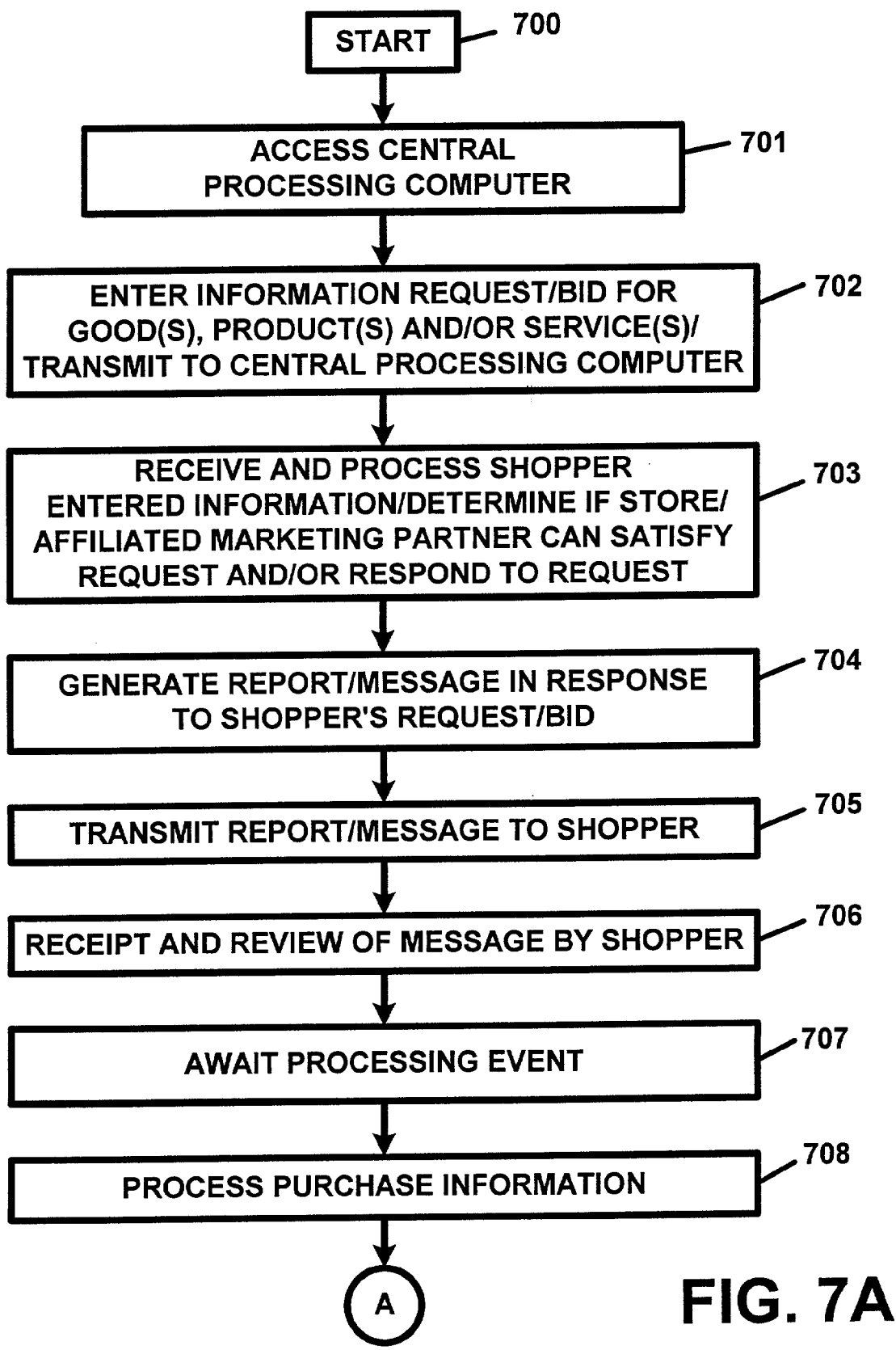
FIGS. 7A and 7B illustrate another preferred embodiment method for utilizing the apparatus of the present invention, in flow diagram form.
Figure 7B:
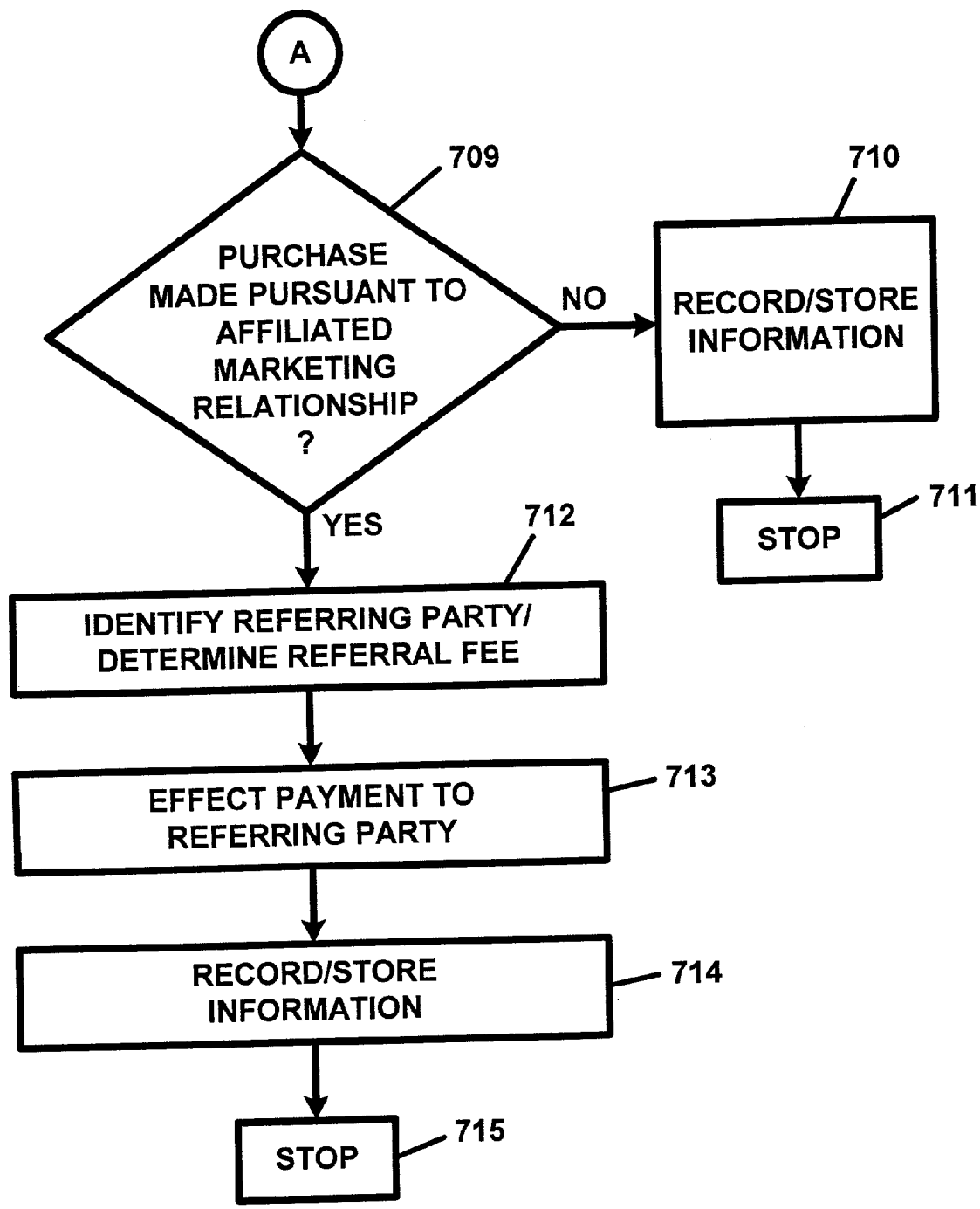

FIGS. 7A and 7B illustrate another preferred embodiment method for utilizing the apparatus 100 of the present invention in an affiliated marketing application. With reference to FIGS. 7A and 7B, the operation of the apparatus 100 commences at step 700.

At step 701, the shopper can access the central processing computer 10 via the user device 20 which can be any of the herein-described user devices 20 and/or can be a public kiosk which can be located at, in, or in the vicinity of, any one or more of an establishment, a store, a retail store, a wholesale store, a wholesaler, and/or a commercial establishment, and/ or in, in, or in the vicinity of, a mall of establishments, stores, retail stores, wholesale stores, wholesalers, and/or commercial establishments.

At step 702, the shopper can enter a request for information for any good(s), product(s), and/or service(s), which he or she desires to purchase and/or obtain information. At step 702, the shopper can also enter a bid to purchase the good(s), product(s), and/or service(s). At step 702, the shopper entered information can be transmitted to the central processing computer 10 and/or to the administrative computer 30.

At step 703 the central processing computer 10 and/or the administrative computer 30 can receive and process the shopper entered information. At step 703, the central processing computer 10 and/or the administrative computer 30 can process the shopper entered information regarding the request for information regarding the good(s), product(s), and/or service(s), and/or can process the shopper's bid for the good(s), product(s), and/or service(s).

At step 703, the central processing computer 10 and/or the administrative computer 30 can any one or more of determine whether the respective establishment, store, retail store, wholesale store, wholesaler, and/or commercial establishment, associated with the central processing computer 10 accessed by the shopper, which is defined to be respective "referring" establishment, "referring" store, "referring" retail store, "referring" wholesale store, "referring" wholesaler, and/or "referring" commercial establishment, has or can provide the good(s), product(s), and/or service(s), whether the respective establishment, store, retail store, wholesale store, wholesaler, and/or commercial establishment, can provide the requested information, and/or whether the respective establishment, store, retail store, wholesale store, wholesaler, and/or commercial establishment, will accept the shopper's bid and/or make a counter offer to the shopper's bid.

At step 703, the central processing computer 10 and/or the administrative computer 30 can also determine whether its affiliated marketing partner or affiliated marketing partners, which are defined to be any of the respective establishment(s), store(s), retail store(s), wholesale store(s), wholesaler(s), and/or commercial establishment(s), with which the respective "referring" establishment, "referring" store, "referring" retail store, "referring" wholesale store, "referring" wholesaler, and/or "referring" commercial establishment, has an affiliated marketing relationship, has or can provide the good(s), product(s), and/or service(s), whether the respective affiliated marketing partner or affiliated marketing partners, can provide the requested information, and/or whether the affiliated marketing partner or affiliated marketing partners, will accept the shopper's bid and/or make a counter offer to the shopper's bid.

The central processing computer 10 and/or the administrative computer 30 can also determine whether an affiliated marketing partner or partners can offer to sell any good(s), product(s), and/or service(s), to the shopper which can be the good(s), product(s), or service(s) about which information was requested and/or on which a bid was made, which can be comparable to, which can be complementary to, which can be supplementary to, which can be an accessory for, and/or which can be a substitute for, the good(s), product(s), or service(s) about which information was requested and/or on which a bid was made, and/or which can be utilized in conjunction with, and/or as a supply or staple item for, the good(s), product(s), or service(s), about which information was requested and/or on which a bid was made.

The central processing computer 10 and/or the administrative computer 30 can also, at step 703, determine whether, based on any information regarding the shopper's profile, buying habits, and/or buying history, the affiliated marketing partner or any of the affiliated marketing partners can provide information and/or an offer, to the shopper, for or regarding any other comparable, complementary, supplementary, and/or accessory, goods, products, and/or services, which may be provided by the respective affiliated marketing partner(s). For example, a male shopper can enter into a shopping mall and request information for, or a bid to purchase, a men's sports jacket, at store A.

In addition to processing the shopper's request or bid for Store A, the central processing computer 10 and/or the administrative computer 30 can, at step 703, determine whether Store B has a man's sport jacket which is the same as and/or which is comparable to the men's sports jacket which the shopper requested information regarding and/or for which a bid has been submitted. The central processing computer 10 and/or the administrative computer 30 can also, at step 703 identify shirts, trousers, ties, and/or accessories, which are or which can be offered by store B which the shopper may also be interested in and/or be inclined to purchase.

The central processing computer 10 and/or the administrative computer 30 can also, at step 703, identify shirts, trousers, ties, and/or accessories, which are or which can be offered by Store A which the shopper may also be interested in and/or be inclined to purchase.

At step 703, the central processing computer 10 and/or the administrative computer 30 can also identify goods, products, and/or services, which can be the subject of an upsell opportunity for any of the respective establishments, stores, retail stores, wholesale stores, wholesalers, and/or commercial establishments, and/or for an affiliated marketing partner or affiliated marketing partners of same.

As used herein, the term "upsell" refers an opportunity and/or a sales activity for any of the herein-described establishments, stores, retail stores, wholesale stores, wholesalers, and/or commercial establishments, and/or affiliated marketing partner or affiliated marketing partners, to identify and offer to sell a good, product, or service, at an incremental price above a purchase price of another good, product, or service. For example, if in the example above, Store A or Store B, or another store, accepts the shopper's bid to purchase a sports jacket for $100.00, the respective store can also offer to "upsell" the shopper a shirt and trousers for an additional $25.00 "upsell" price.

At step 704, the central processing computer 10 and/or the administrative computer 30 can generate a report or message in response to the shopper's request for information and/or bid. The report or message can include the requested information about the good(s), product(s), and/or service(s), and/or information regarding whether the shopper's bid was accepted by the referring establishment, store, retail store, wholesale store, wholesaler, and/or commercial establishment.

The report or message can include the requested information about the good(s), product(s), and/or service(s), and/or information regarding whether the shopper's bid was accepted by an affiliated marketing partner or affiliated marketing partners of the referring establishment, store, retail store, wholesale store, wholesaler, and/or commercial establishment.

The report or message, which is generated at step 704, can also contain data and/or information regarding offers by the referring establishment, store, retail store, wholesale store, wholesaler, and/or commercial establishment, to sell other, comparable, complementary, supplementary, and/or accessory, goods, products, and/or services, to the shopper.

The report or message, which is generated at step 704, can also contain data and/or information regarding offers by an affiliated marketing partner of the referring establishment, store, retail store, wholesale store, wholesaler, and/or commercial establishment, to sell other, comparable, complementary, supplementary, and/or accessory, goods, products, and/or services, to the shopper.

The report or message can also contain any information regarding any upsell offers made to the shopper by the referring establishment, store, retail store, wholesale store, wholesaler, and/or commercial establishment. The report or message can also contain any information regarding any upsell offers made to the shopper by an affiliated marketing partner or affiliated marketing partners of the referring establishment, store, retail store, wholesale store, wholesaler, and/or commercial establishment.

The report or message, which is generated at step 704, can also contain coupons and/or electronic coupons containing the goods, products, and/or services offering by the respective the referring establishment, store, retail store, wholesale store, wholesaler, and/or commercial establishment and/or by its affiliated marketing partner or affiliated marketing partners.

The coupon or coupons can include price information, sales price information, bid acceptance information, counter-offer price information, terms and/or conditions of use, offer expiration information, information identifying the referring establishment, store, retail store, wholesale store, wholesaler, and/or commercial establishment and/or its affiliated marketing partner or affiliated marketing partners, and/or advertisements for other good, products, or services. The report, message, coupon and/or electronic coupon can also contain a barcode and/or an electronic barcode for storing information which can be scanned with an appropriate device.

At step 705, the report or message is transmitted to the user device 20 which can be a kiosk, a kiosk used by the shopper to enter the information request or bid, and/or a communication device such as, but not limited to a wireless or cellular telephone or communication device, a beeper, a pager, a personal digital assistant, etc. The report or message can be transmitted to the shopper as a beeper or pager message, as a text message, as a voice message, as an e-mail message, and/or as an electronic transmission.

At step 706, the shopper can receive and review the report or message on the user device 20 and/or on his or her wireless or cellular telephone or communication device, a beeper, a pager, a personal digital assistant. The coupon and/or offering can be printed out in hardcopy form, such as at a printer associated with the user device 20 and/or can be displayed in electronic form, via the display of the user device 20, to a store salesperson of check-out person. Thereafter, the shopper can decide whether or not to make the respective purchase.

At step 707, the central processing computer 10 and/or the administrative computer 30 can await a processing event, which can be triggered by the detection a purchase made by the shopper, a use of the coupon, a use of the electronic coupon, and/or the expiration of a time period associated with the coupon, the electronic coupon, a bid acceptance, a bid counteroffer, a sales offering, and/or an upsell offering, etc.

At step 708, the central processing computer 10 and/or the administrative computer 30 can process any information regarding any purchase made by the shopper involving any information, bid acceptance, offer, offering, upsell offering, coupon and/or electronic coupon, provided to the shopper at step 706. At step 708, the central processing computer 10 and/or the administrative computer 30 can process any information regarding any purchase or purchases made involving and/or relating to any affiliated marketing agreement, program, and/or relationship, between the respective parties.

At step 709, the central processing computer 10 and/or the administrative computer 30 can determine whether a purchase and/or purchases were made pursuant to an affiliated marketing agreement, program, and/or relationship. The purchase or purchases can be made at and/or from an affiliated marketing partner's respective establishment, store, retail store, wholesale store, wholesaler, and/or commercial establishment.

The purchase or purchases can also be made at a location remote from the affiliated marketing partner's respective establishment, store, retail store, wholesale store, wholesaler, and/or commercial establishment, such as by utilizing a user device 20 which can be located at, in, or in the vicinity of, the referring establishment, store, retail store, wholesale store, wholesaler, and/or commercial establishment, and/or at a mall or other venue in the vicinity of the referring establishment, store, retail store, wholesale store, wholesaler, and/or commercial establishment.

The purchase or purchases can also be made at location remote from the affiliated marketing partner's respective establishment, store, retail store, wholesale store, wholesaler, and/or commercial establishment, such as by utilizing any of the user devices 20 described herein. For, example, the shopper can take a coupon or electronic coupon home and make an on-line purchase, from a web site associated with the affiliated marketing partner's respective establishment, store, retail store, wholesale store, wholesaler, and/or commercial establishment, via a home computer of other user device 20.

If, at step 709, it is determined that no purchase or purchases was, or were, made pursuant to, and/or involving, an affiliated marketing agreement, program, and/or relationship, the operation of the central processing computer 10 and/or the administrative computer 30 will proceed to step 710. At step 710, the central processing computer 10 and/or the administrative computer 30 will record and/or store information regarding the non-utilization or non-acceptance of any of the offers and/or offerings provided in the report or message.

At step 710, the central processing computer 10 and/or the administrative computer 30 can also record and/or store any other information which can be utilized by the apparatus 100 in order to determine the effectiveness of any of the herein-described activities and/or the affiliated marketing relationships or programs and/or to perform any other appropriate processing functions. Thereafter, the operation of the apparatus 100 will cease at step 711.

If, at step 709, it is determined that a purchase or purchases was, or were, made pursuant to, and/or involving, an affiliated marketing agreement, program, and/or relationship, the operation of the central processing computer 10 and/or the administrative computer 30 will proceed to step 712.

At step 712, the central processing computer 10 and/or administrative computer 30 can identify the referring establishment, store, retail store, wholesale store, wholesaler, and/or commercial establishment, and the affiliated marketing partner. At step 712, the central processing computer 10 and/or administrative computer 30 can determine any referral fee due the referring establishment, store, retail store, wholesale store, wholesaler, and/or commercial establishment, pursuant to the affiliated marketing relationship.

At step 713, the central processing computer 10 and/or administrative computer 30 can effect payment to the referring establishment, store, retail store, wholesale store, wholesaler, and/or commercial establishment. The central processing computer 10 and/or administrative computer 30 can process and/or effect payment by transferring funds from a financial account which it administers for the respective affiliated marketing partner to a financial account which it administers for the respective referring establishment, store, retail store, wholesale store, wholesaler, and/or commercial establishment.

For example, the central processing computer 10 and/or the administrative computer 30 can effect payment, such as via an electronic funds transfer, from affiliated marketing partner Store B's financial account, to referring Store A's financial account, as payment for Store A referring the shopper, and the purchase, to Store B.

In the preferred embodiment of FIGS. 7A and 7B, each of the central processing computer 10 and the administrative computer 30 can administer financial accounts for any of the affiliated marketing partners and referring establishments, stores, retail stores, wholesale stores, wholesalers, and/or commercial establishments, which utilize the apparatus 100 of the present invention. The central processing computer 10 and the administrative computer 30 can effectuate electronic funds transfer to and from any of the respective accounts to effectuate referral payments pursuant to the affiliated marketing relationships.

At step 714, the central processing computer 10 and/or the administrative computer 30 can record and/or store information regarding the utilization or acceptance of any of the offers and/or offerings provided in the report or message as well as any information regarding the earning of and/or the payment of any referral fees pursuant to any affiliated marketing activities.

At step 714, the central processing computer 10 and/or the administrative computer 30 can also record and/or store any other information which can be utilized by the apparatus 100 in order to determine the effectiveness of any of the herein-described activities and/or the affiliated marketing relationships or programs and/or to perform any other appropriate processing functions. Thereafter, the operation of the apparatus 100 will cease at step 715.

In another preferred embodiment of the embodiment of FIGS. 7A and 7B, a kiosk or other user device 20 can be associated with a mall operator or other non-store entity which can be utilized in an affiliating marketing embodiment wherein the mall operator or other non-store entity can be the referring establishment or entity.

In another preferred embodiment, the apparatus 100 can be utilized in another affiliated marketing relationship embodiment, wherein an affiliated marketing partner(s) can be notified of the presence of a shopper for, and/or the willingness and/or the interest of the shopper to make a purchase of, a good(s), product(s), and/or service(s). The affiliated marketing partner(s) can thereafter communicate with the shopper via the central processing computer 10 and/or the administrative computer 30 in order to provide information regarding a good(s), product(s), and/or service(s), to the shopper. The affiliated marketing partner(s) can also, via the central processing computer 10 and/or the administrative computer 30, accept a bid by the shopper, make a counteroffer, an offer, and/or an upsell offer, to the shopper.

Figure 8A:
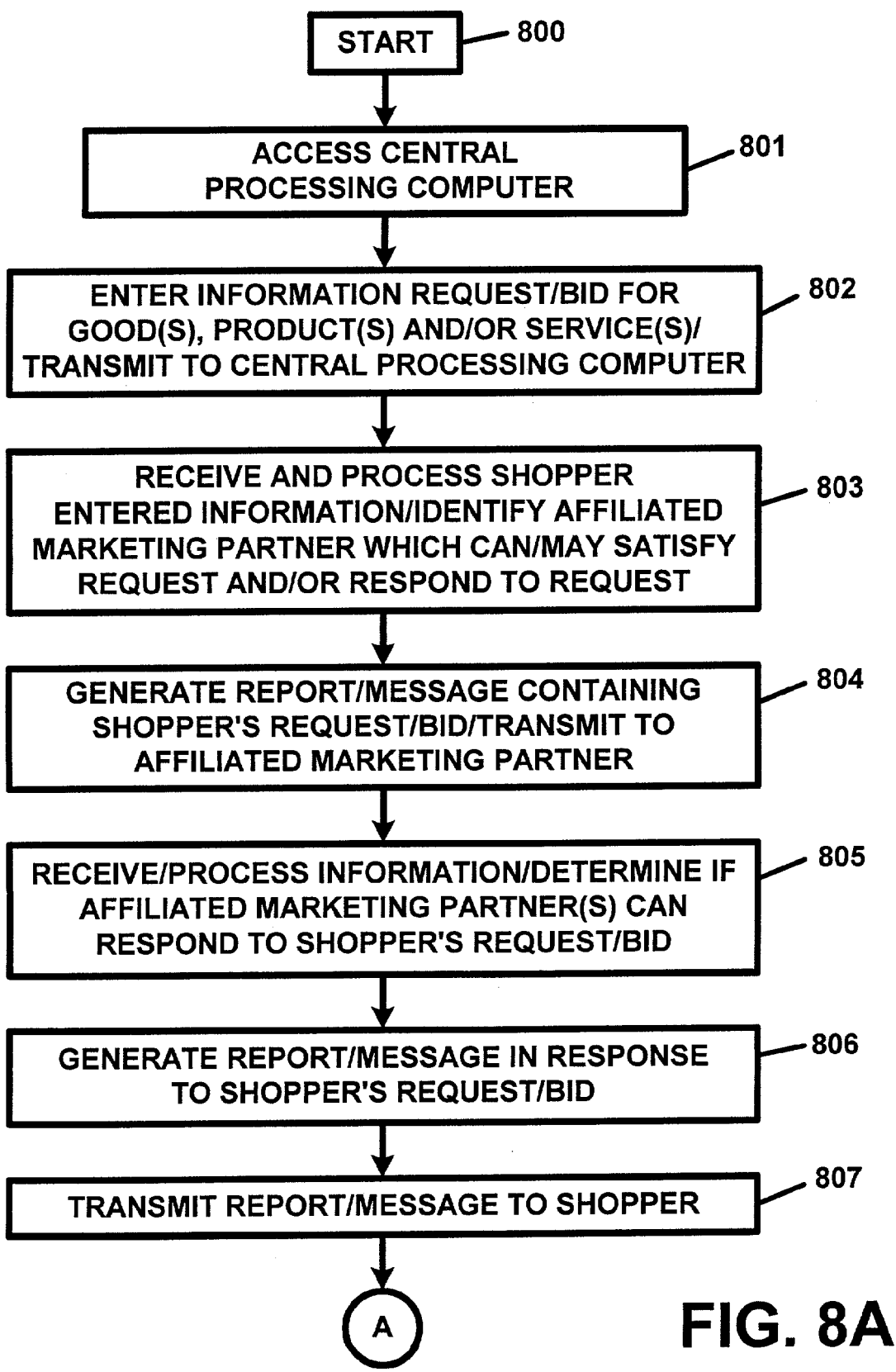
FIGS. 8A and 8B illustrate still another preferred embodiment method for utilizing the apparatus of the present invention, in flow diagram form.
Figure 8B:
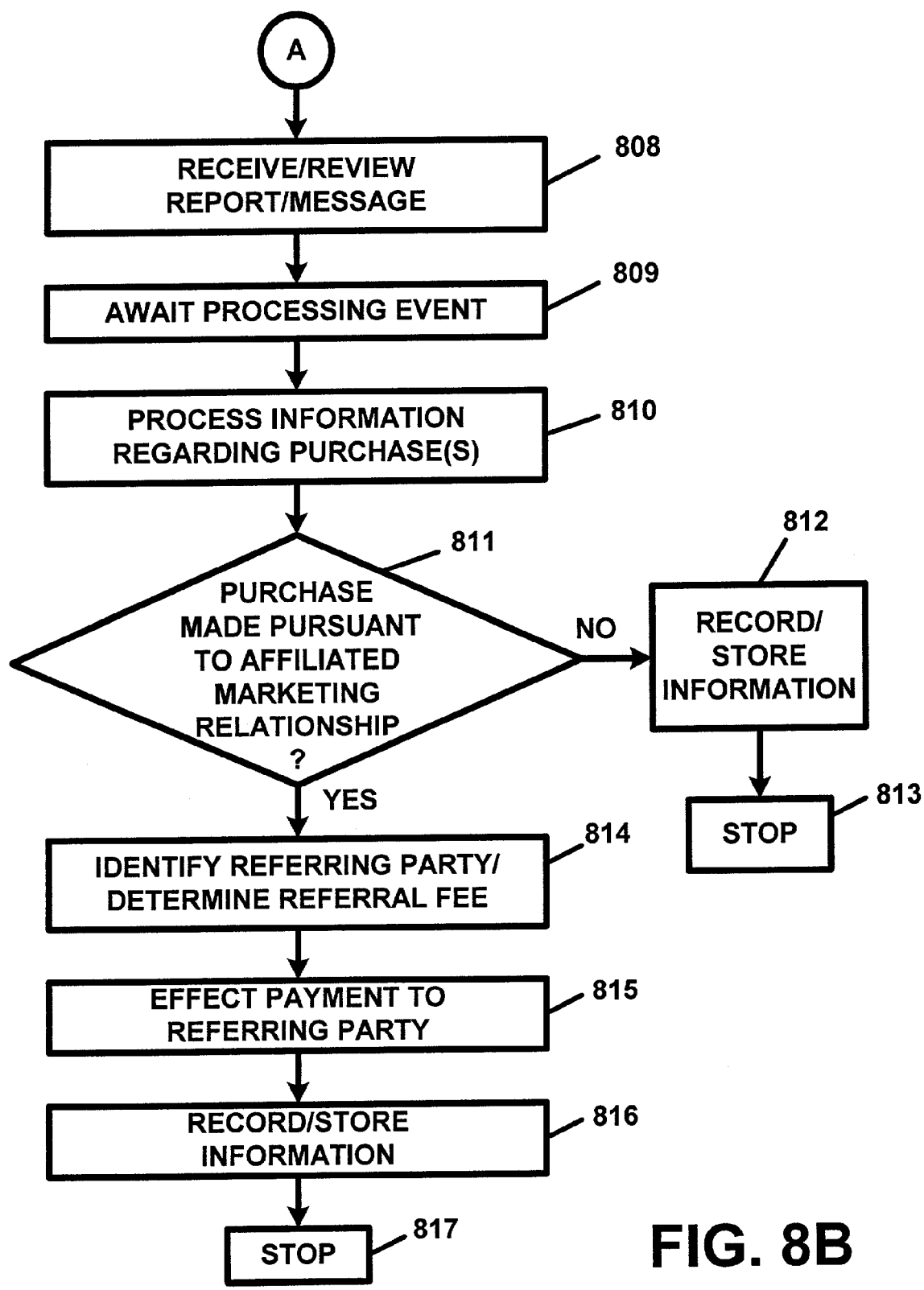

FIGS. 8A and 8B illustrate another preferred embodiment method for utilizing the apparatus 100 of the present invention. With reference to FIGS. 8A and 8B, the operation of the apparatus 100 commences at step 800. At step 801, the shopper can access the central processing computer 10 via the user device 20 which can be any of the herein-described user devices 20 and/or can be a public kiosk which can be located at, in, or in the vicinity of, any one or more of an establishment, a store, a retail store, a wholesale store, a wholesaler, and/or a commercial establishment, and/or in, in, or in the vicinity of, a mall of establishments, stores, retail stores, wholesale stores, wholesalers, and/or commercial establishments.

At step 802, the shopper can enter a request for information for any good(s), product(s), and/or service(s), which he or she desires to purchase and/or obtain information. At step 802, the shopper can also enter a bid to purchase the good(s), product(s), and/or service(s). At step 802, the shopper entered information can be transmitted to the central processing computer 10 and/or to the administrative computer 30.

At step 803 the central processing computer 10 and/or the administrative computer 30 can receive and process the shopper entered information. At step 803, the central processing computer 10 and/or the administrative computer 30 can process the shopper entered information regarding the request for information regarding the good(s), product(s), and/or service(s), and/or can process the shopper's bid for the good(s), product(s), and/or service(s).

At step 803, the central processing computer 10 and/or the administrative computer 30 can process the shopper's information request or bid. At step 803, the central processing computer 10 and/or the administrative computer 30 can also identify an affiliated marketing partner or partners which may be interested in responding to the shopper's information request or bid.

At step 804, the central processing computer 10 and/or the administrative computer 30 can generate a message containing the shopper's information request and/or the shopper's bid. At step 804, the central processing computer 10 and/or the administrative computer 30 can transmit the message to a central processing computer 10 and/or an administrative computer 30, and/or any other suitable communication device, which is associated with each identified affiliated marketing partner(s) identified at step 803.

At step 805, the central processing computer 10 and/or an administrative computer 30, and/or any other suitable communication device, which is associated with each identified affiliated marketing partner, can process the information contained in message.

At step 805, the central processing computer 10 and/or an administrative computer 30, and/or any other suitable communication device, which is associated with each identified affiliated marketing partner, can process the information contained in the message in order to determine if the affiliated marketing partner(s) can provide the requested information, and/or whether the respective affiliated marketing partner(s), will accept the shopper's bid and/or make a counter offer to the shopper's bid.

The central processing computer 10 and/or the administrative computer 30 can also determine whether the affiliated marketing partner(s) can offer to sell any good(s), product(s), and/or service(s), to the shopper which can be the good(s), product(s), or service(s) about which information was requested and/or on which a bid was made, which can be comparable to, which can be complementary to, which can be supplementary to, which can be an accessory for, and/or which can be a substitute for, the good(s), product(s), or service(s) about which information was requested and/or on which a bid was made, and/or which can be utilized in conjunction with, and/or as a supply or staple item for, the good(s), product(s), or service(s), about which information was requested and/or on which a bid was made.

The central processing computer 10 and/or the administrative computer 30 of the affiliated marketing partner(s) can also, at step 805, determine whether, based on any information regarding the shopper's profile, buying habits, and/or buying history, the affiliated marketing partner(s) can provide information and/or an offer, to the shopper, for or regarding any other comparable, complementary, supplementary, and/or accessory, goods, products, and/or services, which may be provided by the respective affiliated marketing partner(s).

In addition to processing the shopper's request or bid the central processing computer 10 and/or the administrative computer 30 of the affiliated marketing partner(s) can also, at step 805, determine whether the affiliated marketing partner(s) has a good(s), product(s), and/or services, which is the same as and/or which is comparable to the item(s) which is the subject matter of the shopper's information request or bid.

The central processing computer 10 and/or the administrative computer 30 of the affiliated marketing partner(s) can also, at step 805, identify any good(s), product(s), and/or service(s), which are or which can be offered by the affiliated marketing partner(s) which the shopper may also be interested in and/or be inclined to purchase.

At step 805, the central processing computer 10 and/or the administrative computer 30 of the affiliated marketing partner(s) can also identify goods, products, and/or services, which can be the subject of an upsell opportunity for the affiliated marketing partner(s).

At step 806, the central processing computer 10 and/or the administrative computer 30 of the affiliated marketing partner(s) can generate a report or message in response to the shopper's request for information and/or bid. The report or message can include the requested information about the good(s), product(s), and/or service(s), and/or information regarding whether the shopper's bid was accepted by the affiliated marketing partner(s). The report or message can include the requested information about the good(s), product(s), and/or service(s), and/or information regarding whether the shopper's bid was accepted by the affiliated marketing partner(s) of the referring establishment, store, retail store, wholesale store, wholesaler, and/or commercial establishment.

The report or message, which is generated at step 806, can also contain data and/or information regarding offers by the affiliated marketing partner(s), to sell other, comparable, complementary, supplementary, and/or accessory, goods, products, and/or services, to the shopper.

The report or message can also contain any information regarding any upsell offers made to the shopper by the affiliated marketing partner(s).

The report or message, which is generated at step 806, can also contain coupons and/or electronic coupons containing the goods, products, and/or services offering by the respective the affiliated marketing partner(s). The coupon or coupons can include price information, sales price information, bid acceptance information, counteroffer price information, terms and/or conditions of use, offer expiration information, information identifying the affiliated marketing partner(s), and/or advertisements for other good, products, or services. The report, message, coupon and/or electronic coupon can also contain a barcode and/or an electronic barcode for storing information which can be scanned with an appropriate device.

At step 807, the report or message is transmitted to the user device 20 either directly, via a communication network, and/or via the central processing computer 10 and/or the administrative computer 30 of the referring establishment, store, retail store, wholesale store, wholesaler, and/or commercial establishment. The user device 20 can be a kiosk, a kiosk used by the shopper to enter the information request or bid, and/or a communication device such as, but not limited to a wireless or cellular telephone or communication device, a beeper, a pager, a personal digital assistant, etc. The report or message can be transmitted to the shopper as a beeper or pager message, as a text message, as a voice message, as an e-mail message, and/or as an electronic transmission.

At step 808, the shopper can receive and review the report or message on the user device 20 and/or on his or her wireless or cellular telephone or communication device, a beeper, a pager, a personal digital assistant. The coupon and/or offering can be printed out in hardcopy form, such as at a printer associated with the user device 20 and/or can be displayed in electronic form, via the display of the user device 20, to a store salesperson of check-out person. Thereafter, the shopper can decide whether or not to make the respective purchase.

At step 809, the central processing computer 10 and/or the administrative computer 30 can await a processing event, which can be triggered by the detection a purchase made by the shopper, a use of the coupon, a use of the electronic coupon, and/or the expiration of a time period associated with the coupon, the electronic coupon, a bid acceptance, a bid counteroffer, a sales offering, and/or an upsell offering, etc.

At step 810, the central processing computer 10 and/or the administrative computer 30 can process any information regarding any purchase made by the shopper involving any information, bid acceptance, offer, offering, upsell offering, coupon and/or electronic coupon, provided to the shopper at step 808.

The central processing computer 10 and/or the administrative computer 30 of the referring establishment, store, retail store, wholesale store, wholesaler, and/or commercial establishment can be linked with the central processing computer 10 and/or the administrative computer 30 of the affiliated marketing partner(s) so the central processing computer 10 and/or the administrative computer 30 associated with the referring establishment, store, retail store, wholesale store, wholesaler, and/or commercial establishment can receive and process any information regarding any purchases and/or other transactions for which the referring establishment, store, retail store, wholesale store, wholesaler, and/or commercial establishment, may be entitled to receive a referral fee and/or other compensation pursuant to the affiliated marketing relationship.

At step 810, the central processing computer 10 and/or the administrative computer 30 can process any information regarding any purchase or purchases made involving and/or relating to an affiliated marketing agreement, program, and/or relationship, between the respective parties.

At step 811, the central processing computer 10 and/or the administrative computer 30 can determine whether a purchase and/or purchases were made pursuant to an affiliated marketing agreement, program, and/or relationship. The purchase or purchases can be made at and/or from an affiliated marketing partner's respective establishment, store, retail store, wholesale store, wholesaler, and/or commercial establishment.

The purchase or purchases can also be made at a location remote from the affiliated marketing partner's respective establishment, store, retail store, wholesale store, wholesaler, and/or commercial establishment, such as by utilizing a user device 20 which can be located at, in, or in the vicinity of, the referring establishment, store, retail store, wholesale store, wholesaler, and/or commercial establishment, and/or at a mall or other venue in the vicinity of the referring establishment, store, retail store, wholesale store, wholesaler, and/or commercial establishment.

The purchase or purchases can also be made at location remote from the affiliated marketing partner's respective establishment, store, retail store, wholesale store, wholesaler, and/or commercial establishment, such as by utilizing any of the user devices 20 described herein. For, example, the shopper can take a coupon or electronic coupon home and make an on-line purchase, from a web site associated with the affiliated marketing partner's respective establishment, store, retail store, wholesale store, wholesaler, and/or commercial establishment, via a home computer of other user device 20.

If, at step 811, it is determined that no purchase or purchases was, or were, made pursuant to, and/or involving, an affiliated marketing agreement, program, and/or relationship, the operation of the central processing computer 10 and/or the administrative computer 30 will proceed to step 812. At step 812, the central processing computer 10 and/or the administrative computer 30 will record and/or store information regarding the non-utilization or non-acceptance of any of the offers and/or offerings provided in the report or message.

At step 812, the central processing computer 10 and/or the administrative computer 30 can also record and/or store any other information which can be utilized by the apparatus 100 in order to determine the effectiveness of any of the herein-described activities and/or the affiliated marketing relationships or programs and/or to perform any other appropriate processing functions. Thereafter, the operation of the apparatus 100 will cease at step 813.

If, at step 811, it is determined that a purchase or purchases was, or were, made pursuant to, and/or involving, an affiliated marketing agreement, program, and/or relationship, the operation of the central processing computer 10 and/or the administrative computer 30 will proceed to step 814. At step 814, the central processing computer 10 and/or administrative computer 30 can identify the referring establishment, store, retail store, wholesale store, wholesaler, and/or commercial establishment, and the affiliated marketing partner.

At step 814, the central processing computer 10 and/or administrative computer 30 can determine any referral fee due the referring establishment, store, retail store, wholesale store, wholesaler, and/or commercial establishment, pursuant to the affiliated marketing relationship.

At step 815, the central processing computer 10 and/or administrative computer 30 can effect payment to the referring establishment, store, retail store, wholesale store, wholesaler, and/or commercial establishment. The central processing computer 10 and/or administrative computer 30 can process and/or effect payment by transferring funds from a financial account which it administers for the respective affiliated marketing partner(s) to a financial account which it administers for the respective referring establishment, store, retail store, wholesale store, wholesaler, and/or commercial establishment.

In the preferred embodiment of FIGS. 8A and 8B, each of the central processing computer 10 and the administrative computer 30 can administer financial accounts for any of the affiliated marketing partners and referring establishments, stores, retail stores, wholesale stores, wholesalers, and/or commercial establishments, which utilize the apparatus 100 of the present invention. The central processing computer 10 and the administrative computer 30 can effectuate electronic funds transfer to and from any of the respective accounts to effectuate referral payments pursuant to the affiliated marketing relationships.

At step 816, the central processing computer 10 and/or the administrative computer 30 can record and/or store information regarding the utilization or acceptance of any of the offers and/or offerings provided in the report or message as well as any information regarding the earning of and/or the payment of any referral fees pursuant to any affiliated marketing activities.

At step 816, the central processing computer 10 and/or the administrative computer 30 can also record and/or store any other information which can be utilized by the apparatus 100 in order to determine the effectiveness of any of the herein-described activities and/or the affiliated marketing relationships or programs and/or to perform any other appropriate processing functions. Thereafter, the operation of the apparatus 100 will cease at step 817.

In another preferred embodiment of the embodiment of FIGS. 8A and 8B, a kiosk or other user device 20 can be associated with a mall operator or other non-store entity which can be utilized in an affiliating marketing embodiment wherein the mall operator or other non-store entity can be the referring establishment or entity.

In another preferred embodiment, the apparatus 100 and method of the present invention can be utilized by any of the herein-described establishments, stores, retail stores, wholesale stores, wholesalers, and/or commercial establishments, in order to process information regarding a group of available shoppers and to communicate with any one or more of these shoppers while they may be in, at, or in the vicinity of, the respective establishment, store, retail store, wholesale store, wholesaler, and/or commercial establishment.

The respective establishment, store, retail store, wholesale store, wholesaler, and/or commercial establishment, can generate and transmit sales messages, sales offerings, discount offerings, upsell offerings, etc., to any one or more shoppers.

The respective establishment, store, retail store, wholesale store, wholesaler, and/or commercial establishment, can generate and transmit sales messages, sales offerings, discount offerings, upsell offerings, etc., to any one or more shoppers based on the respective shopper's purchasing habits, personal spending habits, personal characteristics, personal profiles, and/or any other appropriate information which can be gathered and/or stored regarding the individual shoppers.

It is also envisioned that individual shoppers can register with the apparatus 100 such as by providing name, age, sex, income, buying habits, fashion tastes, projected buying budgets, projected spending, credit information, favorite goods, products, and services, marital status, information regarding children or other dependents, and/or any other information, including demographic information, etc.

The shoppers can register or "sign in" when entering an establishment, store, retail store, wholesale store, wholesaler, and/or commercial establishment, such as by entering information into a kiosk or other user device 20 and/or by transmitting a "sign in" signal or transmission, via a user communication device such as a wireless or cellular telephone, a beeper, pager, a personal digital assistant, and/or any other personal communication device, to the central processing computer 10 and/or administrative computer 30.

The central processing computer 10 and/or the administrative computer 30 can await a processing event, upon the occurrence of which it can process information regarding goods, products, and/or services, which are available for sale in conjunction with the available shoppers currently in, at, or in the vicinity of, the respective establishment, store, retail store, wholesale store, wholesaler, and/or commercial establishment.

The central processing computer 10 and/or the administrative computer 30 can, thereafter, generate personal messages with sales offerings, and/or upsell offerings, which can contain coupons and/or electronic coupons, and/or any other information described herein in any and/or all of the embodiments described herein. The personal messages can then be transmitted to each shopper for his or her use.

Figure 9:
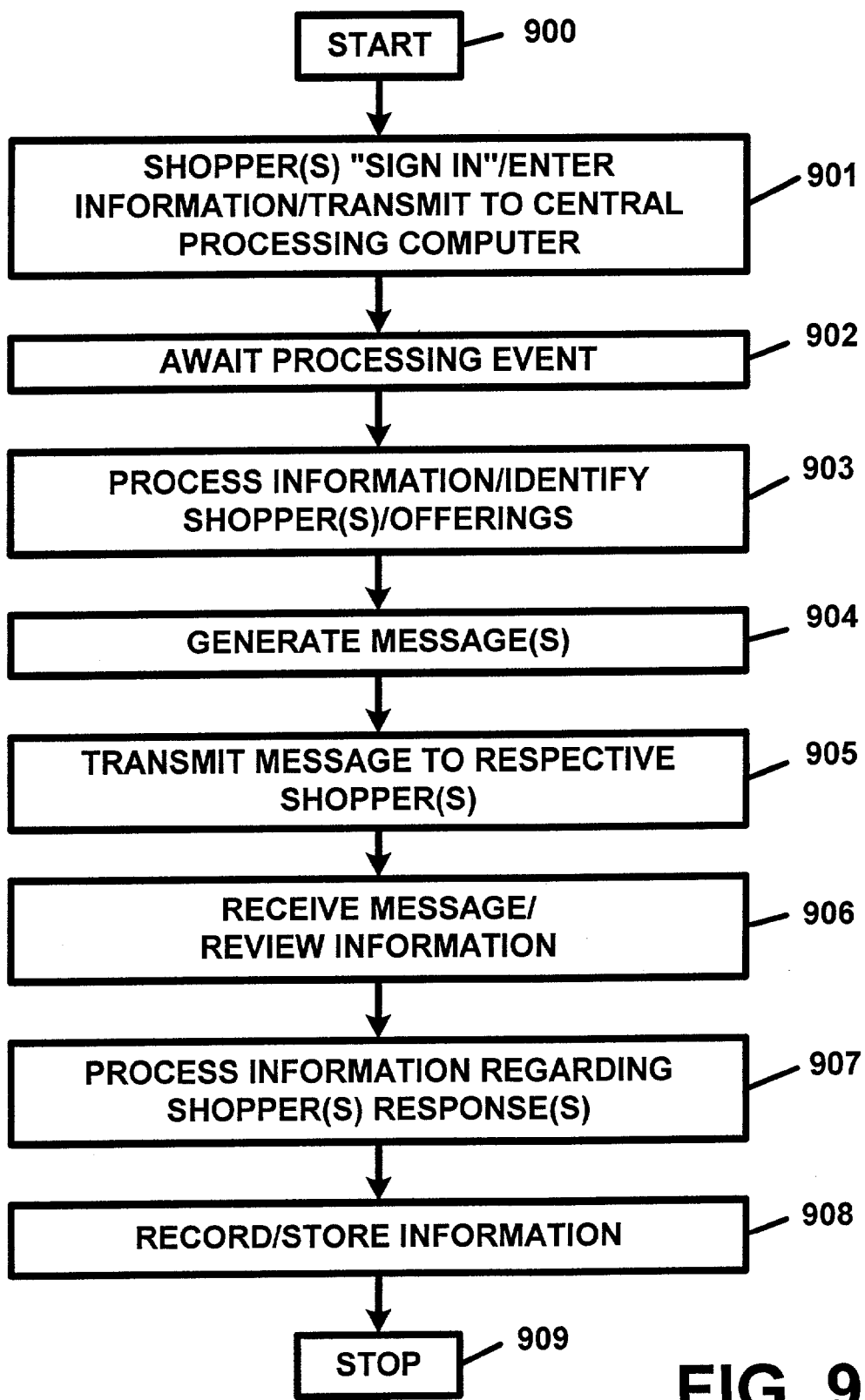
FIG. 9 illustrates yet another preferred embodiment method for utilizing the apparatus of the present invention, in flow diagram form.

FIG. 9 illustrates another preferred embodiment method for utilizing the apparatus 100 of the present invention. With reference to FIG. 9, the operation of the apparatus 100 commences at step 900. At step 901, a shopper or any number of shoppers can register or "sign in" to a respective establishment, store, retail store, wholesale store, wholesaler, and/or commercial establishment, upon entering same and/or at any other time thereafter.

The shopper may "sign in" by accessing the central processing computer 10 and/or the administrative computer 30 via a user device 20 which can be a kiosk and/or any other user device described herein. It is envisioned that shoppers can have their personal profiles and/or personal spending profiles, spending habit information and/or any other information stored in the respective databases 10G and/or 30G.

The shopper, at step 901, can also enter information regarding any goods, products, and/or services, which he or she may be interested in purchasing on the occasion. At step 901, the shopper's "sign in" information can also be transmitted to and received at the central processing computer 10 and/or the administrative computer 30.

At step 902, the central processing computer 10 and/or the administrative computer 30 can await a processing event. The processing event can be any event which can give rise to the respective establishment, store, retail store, wholesale store, wholesaler, and/or commercial establishment, generating a promotion a and/or sales offering message and transmitting same to any number of shoppers. The processing event can be, but is not limited to, a pre-specified time, the expiration of a time interval, a sales event, a determination that sales goals are not being met for a certain time period, the "signing in" of a shopper having a certain shopper profile, a shopper's shopping pattern, shopper's shopping patterns, the "signing in" of a certain number of shoppers of a certain profile, the "signing in" or presence of a certain number of shoppers, etc.

Upon the occurrence of the processing event, the operation of the apparatus 100 will proceed to step 903 and the central processing computer 10 and/or the administrative computer 30 will process the information regarding the "signed in" shoppers in conjunction with any of the herein-described information which is stored in the database 10G and/or the database 30G.

At step 903, the central processing computer 10 and/or the administrative computer 30 will, for any one or more of the "signed in" shoppers, identify the shopper or shoppers and identify sales offerings, discount offerings, and/or upsell offerings, for any goods, products, and/or services, that the respective establishment, store, retail store, wholesale store, wholesaler, and/or commercial establishment, sells or provides. The central processing computer 10 and/or the administrative computer 30 can, at step 904, generate a message for any one or more of, and/or for each of, the shopper or shoppers who are "signed in" to the respective establishment, store, retail store, wholesale store, wholesaler, and/or commercial establishment.

The message can contain information regarding sales offerings, discount offerings, and/or upsell offerings, and/or coupons and/or electronic coupons as described herein, and/or any other information.

At step 905, the central processing computer 10 and/or the administrative computer 30, will transmit each generated message to the respective "signed in" shopper for which a message was generated. Shoppers who have "signed out" of the store, such as by doing so at a kiosk or user device 20 upon leaving the respective establishment, store, retail store, wholesale store, wholesaler, and/or commercial establishment, may or may not receive the message depending upon their desire to receive same and/or the policy of the respective establishment, store, retail store, wholesale store, wholesaler, and/or commercial establishment. The message can be transmitted as a beeper or pager message, as a text message, as a voice message, as an e-mail message, and/or as an electronic transmission.

At step 906, the shopper can receive the message on a kiosk or other user device 20, and/or on a wireless telephone, personal communication device, personal digital assistant, beeper or pager, and/or any other communication device. Thereafter, the shopper can utilize the information contained in the message, such as, for example, the information regarding the sales offerings, discount offerings, upsell offerings, coupons and/or electronic coupons, in order to make purchases at the respective establishment, store, retail store, wholesale store, wholesaler, and/or commercial establishment.

At 907, the central processing computer 10 and/or the administrative computer 30 can process information regarding the shopper or shoppers' response to the message generation and dissemination. The central processing computer 10 and/or the administrative computer 30 can any one or more of process sales information at pre-determined intervals in order to determine which goods, products, and/or services, may have been purchased, process information regarding the redemption of coupons and/or electronic coupons, process information regarding the use of and/or the non-use of any of the herein-described coupons and/or electronic coupons, process information regarding a shopper's and/or multiple shopper's purchases during the period after the message dissemination, process sales information at the end of a pre-determined sales period, any or process any other pertinent information based upon any other appropriate event or criteria.

At step 908, the central processing computer 10 and/or the administrative computer 30 can record and store any information regarding the response to the message dissemination in its respective database 10G and/or database 30G. Thereafter, the operation of the apparatus 100 will cease at step 909.

In another preferred embodiment, the apparatus 100 and method of the present invention can be utilized by any of the herein-described establishments, stores, retail stores, wholesale stores, wholesalers, and/or commercial establishments, in order to process information regarding a shopper or multiple shoppers as they enter into, and/or as they enter the vicinity of, a respective establishment, store, retail store, wholesale store, wholesaler, and/or commercial establishment, and/or a mall or group of same.

Upon receiving information that a shopper or shoppers are in, at, or in the vicinity of, a respective establishment, store, retail store, wholesale store, wholesaler, and/or commercial establishment, the central processing computer 10 and/or the administrative computer 30 can communicate with a shopper or shoppers.

The central processing computer 10 and/or the administrative computer 30 can generate and transmit sales messages, sales offerings, discount offerings, upsell offerings, etc., to any one or more shoppers. The respective establishment, store, retail store, wholesale store, wholesaler, and/or commercial establishment, can generate and transmit sales messages, sales offerings, discount offerings, upsell offerings, etc., to any one or more shoppers based on the respective shopper's purchasing habits, personal spending habits, personal characteristics, personal profiles, and/or any other appropriate information which can be gathered and/or stored regarding the individual shoppers.

It is also envisioned that individual shoppers can register with the apparatus 100 such as by providing name, age, sex, income, buying habits, fashion tastes, projected buying budgets, projected spending, credit information, favorite goods, products, and services, marital status, information regarding children or other dependents, and/or any other information, including demographic information, etc.

It is also envisioned that the shopper can have his or her user device 20 equipped with any suitable equipment or device (not shown) which can be detected by the central processing computer 10 and/or the administrative computer 30 when the user device 20 and the shopper are in the vicinity of the respective establishment, store, retail store, wholesale store, wholesaler, and/or commercial establishment, and/or a mall or group of same. It is also envisioned that a shopper or shoppers can have their individual user devices 20, such as, but not limited to a cellular telephone, a wireless telephone, a videophone, a video telephone, a palm device, a palm-top device, a hand-held device, and a personal digital assistant, a beeper, and/or a pager, equipped with a global positioning device (not shown).

The shopper can register his or her user device 20 with the respective establishment, store, retail store, wholesale store, wholesaler, and/or commercial establishment, and/or a mall or group of same.

The shoppers can also register or "sign in" when entering an establishment, store, retail store, wholesale store, wholesaler, and/or commercial establishment, and/or a mall or group of same, such as by entering information into a kiosk or other user device 20 and/or by transmitting a "sign in" signal or transmission, via the user communication device 20 such as a wireless or cellular telephone, a beeper, pager, a personal digital assistant, and/or any other personal communication device, to the central processing computer 10 and/or administrative computer 30 associated with the respective establishment, store, retail store, wholesale store, wholesaler, and/or commercial establishment, and/or a mall or group of same.

The central processing computer 10 and/or the administrative computer 30 can await a processing event, which can be the entering of a shopper or shoppers into, and/or into the vicinity of, the respective establishment, store, retail store, wholesale store, wholesaler, and/or commercial establishment, and/or a mall or group of same. Upon detecting a shopper or shoppers, the central processing computer 10 and/ or the administrative computer 30 can process information regarding goods, products, and/or services, which are available for sale in conjunction with the shopper or shoppers who have entered into, and/or into the vicinity of, the respective establishment, store, retail store, wholesale store, wholesaler, and/or commercial establishment, mall and/or group of same.

The central processing computer 10 and/or the administrative computer 30 can, thereafter, generate personal messages with sales offerings, and/or upsell offerings, which can contain coupons and/or electronic coupons, and/or any other information described herein in any and/or all of the embodiments described herein. The personal messages can then be transmitted to each shopper for his or her use.

Figure 10:
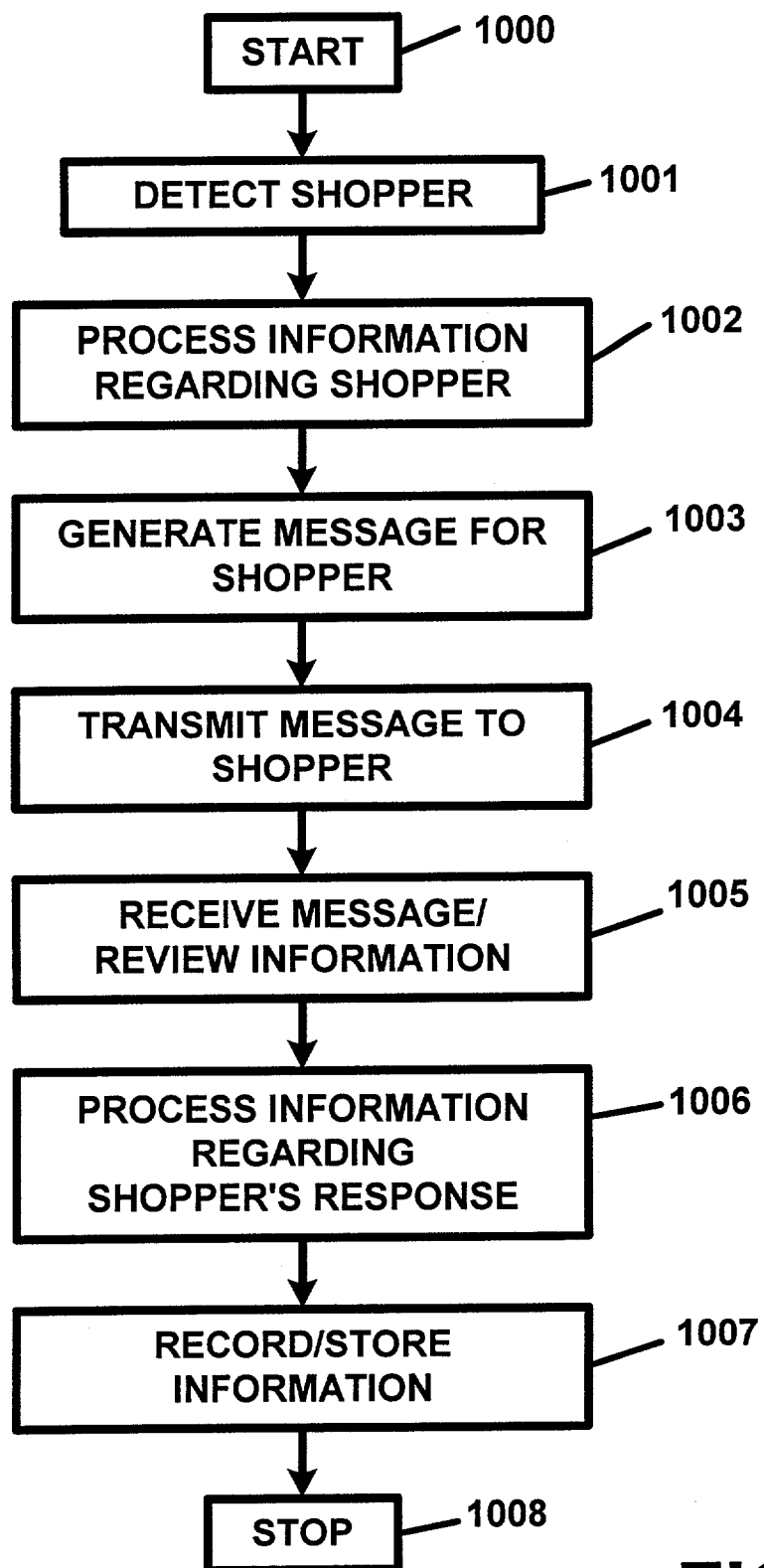
FIG. 10 illustrates another preferred embodiment method for utilizing the apparatus of the present invention, in flow diagram form.

FIG. 10 illustrates another preferred embodiment method for utilizing the apparatus 100 of the present invention. With reference to FIG. 10, the operation of the apparatus 100 commences at step 1000. At step 1001, the central processing computer 10 and/or the administrative computer 30 can detect a shopper entering into, and/or into the vicinity of, the respective establishment, store, retail store, wholesale store, wholesaler, and/or commercial establishment, mall and/or group of same.

The central processing computer 10 and/or the administrative computer 30 can detect the presence of the shopper by receiving a "sign in" signal or transmission from the shopper, who can sign in via his or her user device 20 and/or via a kiosk located at the respective establishment, store, retail store, wholesale store, wholesaler, and/or commercial establishment, mall and/or group of same.

The central processing computer 10 and/or the administrative computer 30 can also detect the presence of the shopper by detecting the shopper's user device 20. The central processing computer 10 and/or the administrative computer 30 can detect the shopper's user device 20 by detecting the detection equipment in the user device 20 and/or by detecting, via the global positioning device equipment located in the user device 20, when the shopper and the user device 20 are at, in, or in the vicinity of, the respective establishment, store, retail store, wholesale store, wholesaler, and/or commercial establishment, mall and/or group of same.

At step 1002, the central processing computer 10 and/or the administrative computer 30 will process the information regarding the detected shopper in conjunction with any of the herein-described information which is stored in the database 10G and/or the database 30G. At step 1002, the central processing computer 10 and/or the administrative computer 30 will identify the detected shopper and identify sales offerings, discount offerings, and/or upsell offerings, for any goods, products, and/or services, that the respective establishment, store, retail store, wholesale store, wholesaler, and/or commercial establishment, sells or provides.

The central processing computer 10 and/or the administrative computer 30 can, at step 1003, generate a message for the detected shopper. The message can contain information regarding sales offerings, discount offerings, and/or upsell offerings, and/or coupons and/or electronic coupons as described herein, and/or any other information.

At step 1004, the central processing computer 10 and/or the administrative computer 30, will transmit the generated message to the detected shopper's user device 20. The message can be transmitted as a beeper or pager message, as a text message, as a voice message, as an email message, and/or as an electronic transmission.

At step 1005, the shopper can receive the message on his or her the user device 20. Thereafter, the shopper can utilize the information contained in the message, such as, for example, the information regarding the sales offerings, discount offerings, upsell offerings, coupons and/or electronic coupons, in order to make purchases at the respective establishment, store, retail store, wholesale store, wholesaler, and/or commercial establishment, and/or mall or group of same.

At 1006, the central processing computer 10 and/or the administrative computer 30 can process information regarding the shopper or shoppers' response to the message. The central processing computer 10 and/or the administrative computer 30 can any one or more of process sales information at pre-determined intervals in order to determine which goods, products, and/or services, may have been purchased by the shopper, process information regarding the shopper's redemption of coupons and/or electronic coupons, process information regarding the use of and/or the non-use of any of the herein-described coupons and/or electronic coupons, process information regarding the shopper's purchases during the period after the message was transmitted to the shopper, process sales information at the end of a pre-determined sales period, any or process any other pertinent information based upon any other appropriate event or criteria.

At step 1007, the central processing computer 10 and/or the administrative computer 30 can record and store any information regarding the shopper's response to the message transmission in its respective database 10G and/or database 30G. Thereafter, the operation of the apparatus 100 will cease at step 1008.

In any and/or all of the embodiments described herein, the apparatus 100 can provide advertisement messages and/or information to any of the individuals or shoppers who utilize the apparatus 100 of the present invention. The apparatus 100 can also be utilized in order to obtain market research information and/or survey information from the individuals or shoppers who utilize the apparatus 100 of the present invention.

While the present invention has been described and illustrated in various preferred embodiments, such descriptions are merely illustrative of the present invention and are not to be construed to be limitations thereof. In this regard, the present invention encompasses all modifications, variations and/or alternate embodiments with the scope of the present invention being limited only by the claims which follow.

What is claimed is:

1. An apparatus, comprising:
   a memory device for storing information regarding at least one of a goal and an expectation regarding at least one of in-store sales, in-store revenues, in-store profits, and in-store losses, regarding a retail store;
   a processor, wherein the processor processes at least one of in-store sales information, in-store revenue information, in-store profit information, and in-store loss information, corresponding to the retail store, in connection with the at least one of a goal and an expectation, in response to a selection or a triggering of an occurrence of an event by a manager or an employee of the retail store, wherein the processor determines whether or not the at least one of a goal and an expectation has been met, and further wherein the processor identifies at least one of a good, a product, and a service, for which an in-store price change is recommended, and further wherein the processor determines an in-store price change for the at least one of a good, a product, and a service, wherein the processor generates a message containing information regarding the in-store price change for the at least one of a good, a product, and a service; and
   a transmitter, wherein the transmitter transmits the message to a wireless device associated with an individual, wherein the wireless device is inside the retail store.

2. An apparatus, comprising:

a memory device for storing information regarding at least one of a goal and an expectation regarding at least one of in-store sales, in-store revenues, in-store profits, and in-store losses, regarding a retail store, and information regarding at least one of a bid and an offer for at least one of a good, a product, and a service, wherein the at least one of a bid and an offer is placed by or made by an individual or a shopper, and further wherein the at least one of a bid and an offer is at least one of entered into the apparatus via an input device and received by a receiver;

a processor, wherein the processor processes at least one of in-store sales information, in-store revenue information, in-store profit information, and in-store loss information, corresponding to the retail store in connection with the at least one of a goal and an expectation, and wherein the processor determines whether or not the at least one of a goal and an expectation has been met, and further wherein the processor processes information regarding the at least one of a bid and an offer and determines whether or not the at least one of a bid and an offer is acceptable, and further wherein the processor determines an in-store price change for the at least one of a good, a product, and a service, for the individual or the shopper in response to the at least one of a bid and an offer, wherein the processor generates a message containing information indicating that the at least one of a bid and an offer is accepted or containing information regarding the in-store price change for the individual or the shopper for the at least one of a good, a product, and a service, in response to the at least one of a bid and an offer; and a transmitter, wherein the transmitter transmits the message to a wireless device associated with the individual or the shopper, wherein the wireless device is inside the retail store.

3. A computer-implemented method, comprising:

storing information regarding at least one of a goal and an expectation regarding at least one of in-store sales, in-store revenues, in-store profits, and in-store losses, regarding a retail store;

selecting or triggering an occurrence of an event, wherein the event is selected or triggered by an employee of the retail store;

processing at least one of in-store sales information, in-store revenue information, in-store profit information, and in-store loss information, corresponding to the retail store in connection with the at least one of a goal and an expectation with a processor in response to the occurrence of an event;

identifying at least one of a good, a product, and a service, for which an in-store price change is recommended;

determining an in-store price change for the at least one of a good, a product, and a service;

generating a message containing information regarding the in-store price change for the at least one of a good, a product, and a service; and transmitting the message to a wireless device associated with an individual, wherein the wireless device is inside the retail store.

4. The computer-implemented method of claim 3, wherein the in-store price change is at least one of a price reduction and a discount.

5. The computer-implemented method of claim 3, further comprising:

at least one of transmitting the information regarding the in-store price change to at least one of a store computer, an electronic price display device, and an electronic bulletin board, and displaying information regarding an in-store price change on or via at least one of a store computer, an electronic price display device, and an electronic bulletin board.

6. The computer-implemented method of claim 3, further comprising:

effecting a price change for the at least one of a good, a product, and a service.

7. The computer-implemented method of claim 3, wherein the in-store price change is a price increase.

8. The computer-implemented method of claim 3, wherein the event is a scheduled sale or a sales promotion.

9. The computer-implemented method of claim 3, wherein the event is at least one of a meeting of at least one of a sales level, a revenue level, a profit level, and a loss level, a start of an accounting period, an end of an accounting period, a receipt of a delivery of a good or product, a selling of a good or product, and a selling out of a good or product.

10. The computer-implemented method of claim 3, wherein the message is transmitted to the wireless device in response to an acceptance of a bid or offer made by the individual.

11. The computer-implemented method of claim 3, further comprising:

providing information regarding the in-store price change to a sales person.

12. The computer-implemented method of claim 3, wherein the message contains information regarding a coupon or an electronic coupon.

13. The computer-implemented method of claim 3, wherein the message contains an advertisement.

14. The computer-implemented method of claim 3, wherein the wireless device is at least one of a cellular telephone, a wireless telephone, and a personal digital assistant.

15. The computer-implemented method of claim 3, wherein the processor processes information regarding a plurality of retail stores.

16. The computer-implemented method of claim 3, further comprising:

at least one of changing a price at least one of on a merchandise rack, on merchandise, and at a check-out register, and displaying information regarding an in-store price change on or via at least one of a display located at least one of on a merchandise display rack, at a check-out register, on a promotional display device, and on an electronic bulletin board.

17. The computer-implemented method of claim 3, further comprising:

storing information input or received via at least one of a cash register system, a sales recording or a sales registering system, an accounts receivable system, and an inventory computer system; and utilizing the information input or received via the at least one of a cash register system, a sales recording or a sales registering system, an accounts receivable system, and an inventory computer system, in at least one of identifying the at least one of a good, a product, and a service, and in determining the in-store price change.

18. The computer-implemented method of claim 3, further comprising:

storing information regarding at least one of a shopping history, a purchasing history, and a buying pattern, of the individual; and utilizing the information regarding the at least one of a shopping history, a purchasing history, and a buying pattern, of the individual in at least one of identifying the at least one of a good, a product, and a service, for which an in-store price change is recommended, and determining the in-store price change for the at least one of a good, a product, and a service.

19. The computer-implemented method of claim 3, further comprising:
   storing information regarding at least one of a bid and an offer for a second at least one of a good, a product, and a service, wherein the at least one of a bid and an offer is placed by or made by the individual or by a shopper;
   processing the information regarding the at least one of a bid and an offer;
   determining whether or not the at least one of a bid and an offer is acceptable;
   determining a second in-store price change for the second at least one of a good, a product, and a service, for the individual or the shopper in response to the at least one of a bid and an offer;
   generating a second message containing information indicating that the at least one of a bid and an offer is accepted, containing information regarding the second in-store price change for the second at least one of a good, a product, and a service, in response to the at least one of a bid and an offer, or containing a counteroffer in response to the at least one of a bid and an offer; and
   transmitting the second message to the wireless device, to a communication device associated with the individual, or to a communication device associated with the shopper.

20. The computer-implemented method of claim 3, wherein the message contains information regarding an electronic coupon and an incentive for using the electronic coupon within a certain time period.

21. The computer-implemented method of claim 3, further comprising:
   processing a payment or a pre-payment for the at least one of a good, a product, and a service, wherein the payment or the pre-payment is made via the wireless device.

22. The computer-implemented method of claim 3, further comprising:
   processing a request by the individual to purchase an option to purchase the at least one of a good, a product, and a service;
   determining a price of the option;
   generating a second message containing information regarding the price of the option; and
   transmitting the second message to the wireless device.

23. The computer-implemented method of claim 3, further comprising:
   storing information regarding at least one of a bid and an offer made by the individual or by a shopper for a second at least one of a good, a product, and a service;
   determining whether the at least one of a bid and an offer is accepted;
   generating a second message, if the at least one of a bid and an offer is accepted, containing information indicating that the at least one of a bid and an offer is accepted; and
   transmitting the second message to the wireless device, to a communication device associated with the individual, or to a communication device associated with the shopper.

24. The computer-implemented method of claim 3, wherein the event is an expiration of a pre-specified time period.

25. The computer-implemented method of claim 3, wherein the event is at least one of a meeting of a sales level or a profit level, a start of an accounting period, an end of an accounting period, an end of a sales event, a receipt of a delivery of a good or a product, and a selling of a good, a product, or a service.

26. The computer-implemented method of claim 3, further comprising:
   identifying a second at least one of a good, a product, and a service, which is a subject of an upsell offer, and further wherein the message contains information regarding the upsell offer.

27. The computer-implemented method of claim 3, wherein, the event is at least one of a detection of a purchase made by the individual or a shopper, a use of a coupon, a use of an electronic coupon, and an expiration of a time period associated with at least one of a coupon, an electronic coupon, and an upsell offer.

28. The computer-implemented method of claim 3, further comprising:
   generating a second message, wherein the second message contains information regarding at least one of a sales offering, an upsell offering, a coupon, and an electronic coupon; and
   transmitting the second message to at least one of the wireless device, a communication device associated with the individual, and a communication device associated with a shopper.

29. The computer-implemented method of claim 3, further comprising:
   processing information regarding the individual, a shopper, or multiple shoppers, entering into the retail store or a mall;
   generating a second message containing at least one of a sales offering, a discount offering, an upsell offering, a coupon, and an electronic coupon; and
   transmitting the second message to at least one of the wireless device, a communication device associated with the shopper, or a communication device associated with at least one of the multiple shoppers.

30. The computer-implemented method of claim 3, further comprising:
   storing information regarding at least one of a request and a bid regarding a second at least one of a good, a product, and a service, wherein the at least one of a request and a bid is made by the individual or by a shopper;
   identifying an affiliated marketing partner, in an affiliated marketing relationship with the retail store, for responding to the at least one of a request and a bid;
   determining whether the affiliated marketing partner is capable of providing information in response to the request or whether the affiliated marketing partner accepts the bid or makes a counteroffer to the bid;
   generating a second message containing information regarding a response to the request, an acceptance of the bid, or a counteroffer to the bid; and
   transmitting the second message to at least one of the wireless device, a communication device associated with the individual, and a communication device associated with the shopper.

31. The computer-implemented method of claim 30, further comprising:
   identifying a third at least one of a good, a product, and a service, which is a subject of an upsell offer, wherein the second message contains information regarding the upsell offer.

32. The computer-implemented method of claim 30, further comprising:
   determining if a purchase is made pursuant to the affiliated marketing relationship; and effecting a payment to the retail store pursuant to the affiliated marketing relationship.

33. A computer-implemented method, comprising:

storing information regarding at least one of a goal and an expectation regarding at least one of in-store sales, in-store revenues, in-store profits, and in-store losses, regarding a retail store, and information regarding at least one of a bid and an offer for at least one of a good, a product, and a service, wherein the at least one of a bid and an offer is placed by or made by an individual or a shopper;

processing at least one of in-store sales information, in-store revenue information, in-store profit information, and in-store loss information, corresponding to the retail store in connection with the at least one of a goal and an expectation with a processor;

processing information regarding the at least one of a bid and an offer with the processor;

determining whether or not the at least one of a bid and an offer is acceptable;

determining an in-store price change for the at least one of a good, a product, and a service, for the individual or the shopper in response to the at least one of a bid and an offer;

generating a message containing information indicating that the at least one of a bid and an offer is accepted or containing information regarding the in-store price change for the individual or the shopper for the at least one of a good, a product, and a service, in response to the at least one of a bid and an offer; and transmitting the message to a wireless device associated with the individual or the shopper, wherein the wireless device is inside the retail store.

34. The computer-implemented method of claim 33, wherein the in-store price change is at least one of a price reduction and a discount.

35. The computer-implemented method of claim 33, further comprising:

at least one of transmitting the information regarding the in-store price change to at least one of a store computer, an electronic price display device, and an electronic bulletin board, and displaying information regarding an in-store price change on or via at least one of a store computer, an electronic price display device, and an electronic bulletin board.

36. The computer-implemented method of claim 33, wherein the in-store price change is a price increase.

37. The computer-implemented method of claim 33, wherein the message contains information regarding a coupon or an electronic coupon.

38. The computer-implemented method of claim 33, wherein the message contains an advertisement.

39. The computer-implemented method of claim 33, wherein the wireless device is at least one of a cellular telephone, a wireless telephone, and a personal digital assistant.

40. The computer-implemented method of claim 33, further comprising:

at least one of changing a price at least one of on a merchandise rack, on merchandise, and at a check-out register, and displaying information regarding an in-store price change on or via at least one of a display located at least one of on a merchandise display rack, at a check-out register, on a promotional display device, and on an electronic bulletin board.

41. The computer-implemented method of claim 33, further comprising:

storing information regarding at least one of a shopping history, a purchasing history, and a buying pattern, of the individual or the shopper; and utilizing the information regarding the at least one of a shopping history, a purchasing history, and a buying pattern, of the individual or the shopper in determining whether the at least one of a bid and an offer is accepted.

42. The computer-implemented method of claim 33, further comprising:

selecting or triggering an occurrence of an event, wherein the event is selected or triggered by an employee of the retail store;

processing at least one of in-store sales information, in-store revenue information, in-store profit information, and in-store loss information, corresponding to the retail store in connection with the at least one of a goal and an expectation in response to the occurrence of an event;

identifying a second at least one of a good, a product, and a service, for which an in-store price change is recommended;

determining an in-store price change for the second at least one of a good, a product, and a service;

generating a second message containing information regarding the in-store price change for the second at least one of a good, a product, and a service; and transmitting the second message to the wireless device associated with the individual or the shopper or to a communication device associated with a second individual.

43. The computer-implemented method of claim 33, wherein the message contains information regarding an electronic coupon and an incentive for using the electronic coupon within a certain time period.

44. The computer-implemented method of claim 33, further comprising:

processing a payment or a pre-payment for the at least one of a good, a product, and a service, wherein the payment or the pre-payment is made via the wireless device.

45. The computer-implemented method of claim 33, further comprising:

processing a request by the individual or the shopper to purchase an option to purchase the at least one of a good, a product, and a service;

determining a price of the option;

generating a second message containing information regarding the price of the option; and transmitting the second message to the wireless device.

46. The computer-implemented method of claim 33, further comprising:

identifying a second at least one of a good, a product, and a service, which is the subject of an upsell offer, and further wherein the message contains information regarding the upsell offer.

47. The computer-implemented method of claim 33, further comprising:

processing information regarding the individual, the shopper, or multiple shoppers, as they enter into the retail store or a mall, or as they enter the retail store or a mall;

generating a second message containing at least one of a sales offering, a discount offering, an upsell offering, a coupon, and an electronic coupon; and transmitting the second message to at least one of the wireless device, a communication device associated with the individual or the shopper, or a communication device associated with at least one of the multiple shoppers.

48. The computer-implemented method of claim 33, wherein the at least one of a bid and an offer is placed or made via the wireless device or the at least one of a bid and an offer is placed or made via a communication device or a kiosk located inside the retail store or inside or at a mall.

49. The computer-implemented method of claim 33, further comprising:
identifying an affiliated marketing partner, in an affiliated marketing relationship with the retail store, for responding to the at least one of a bid and an offer;
determining whether the affiliated marketing partner accepts the at least one of a bid and an offer or whether the affiliated marketing partner makes a counteroffer to the at least one of a bid and an offer;
generating a second message containing information regarding an acceptance of the at least one of a bid and an offer or a counteroffer to the at least one of a bid and an offer; and
transmitting the second message to at least one of the wireless device, a communication device associated with the individual, and a communication device associated with the shopper.

50. The computer-implemented method of claim 49, further comprising:
identifying an upsell opportunity regarding a second at least one of a good, a product, and a service, wherein the second message contains information regarding the upsell offer.

51. The computer-implemented method of claim 49, further comprising:
determining if a purchase is made pursuant to the affiliated marketing relationship; and
effecting a payment to the retail store pursuant to the affiliated marketing relationship.

52. The computer-implemented method of claim 49, further comprising:
generating a second message, wherein the second message contains information regarding at least one of a sales offering, an upsell offering, a coupon, and an electronic coupon; and
transmitting the second message to at least one of the wireless device, a communication device associated with the individual, and a communication device associated with the shopper.

* * * * *